(12) United States Patent
Soryal

(10) Patent No.: US 12,261,644 B2
(45) Date of Patent: Mar. 25, 2025

(54) FACILITATING AERIAL TO SURFACE HETEROGENOUS COMMUNICATIONS IN ADVANCED NETWORKS

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 169 days.

(21) Appl. No.: 17/934,257

(22) Filed: Sep. 22, 2022

(65) Prior Publication Data
US 2024/0106537 A1 Mar. 28, 2024

(51) Int. Cl.
*H04B 10/2575* (2013.01)
*H04B 7/185* (2006.01)

(52) U.S. Cl.
CPC ... *H04B 10/25759* (2013.01); *H04B 7/18506* (2013.01)

(58) Field of Classification Search
CPC .............. H04B 10/25759; H04B 7/18506
USPC ............................................. 398/116
See application file for complete search history.

(56) References Cited

U.S. PATENT DOCUMENTS

| | | | |
|---|---|---|---|
| 2017/0038422 A1* | 2/2017 | Coty ............... | H04B 10/079 |
| 2022/0163376 A1* | 5/2022 | Xia ................. | H04B 10/071 |
| 2023/0283376 A1* | 9/2023 | Morser ........... | H04B 10/25759 |
| | | | 398/115 |

FOREIGN PATENT DOCUMENTS

| | | | | |
|---|---|---|---|---|
| KR | 20190051209 A | * | 5/2019 | |
| WO | WO-2013147809 A1 | * | 10/2013 | ........ H04B 10/112 |

OTHER PUBLICATIONS

Mohsan et al; Intelligent Reflecting Surfaces Assisted UAV Communications for Massive Networks: Current Trends, Challenges, and Research Directions ; Jul. 2022; MDPI; pp. 1-30. (Year: 2022).*
Clara et al; Wireless Connectivity of a Ground-and-Air Sensor Network ; Nov. 2022; pp. 1-6. (Year: 2022).*

* cited by examiner

*Primary Examiner* — Amritbir K Sandhu
(74) *Attorney, Agent, or Firm* — Guntin & Gust, PLC; Kenneth S. Kwan

(57) ABSTRACT

Facilitating auto-pilot aerial to surface heterogenous communications in advanced networks is provided herein. Operations of a system include receiving, via a receiver, a wireless signal that originated from a device located above a ground surface, the network equipment is located below the ground surface. The operations can also include transforming, via a converter, the wireless signal into an optical signal that is transmitted via a fiber optic cable below the ground surface, the receiver and the converter are located on a first side of the fiber optic cable. Further, the operations can include using a reflector to transmit light along the fiber optic cable at a defined angle. The reflector can be located at a second side of the fiber optic cable. The first side is closer to the ground surface as compared to the second side. The defined angle can be an angle approaching zero degrees.

20 Claims, 15 Drawing Sheets

FACILITATING AERIAL TO SURFACE HETEROGENOUS COMMUNICATIONS IN ADVANCED NETWORKS

TECHNICAL FIELD

This disclosure relates generally to the field of mobile communications and, for example, to facilitating connectivity between or among aerial devices, surface devices, and underground devices in advanced networks, e.g., Fourth Generation (4G) networks, Fifth Generation (5G) networks, Sixth Generation (6G) networks, or beyond.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G), Sixth Generation (6G), or other advanced standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
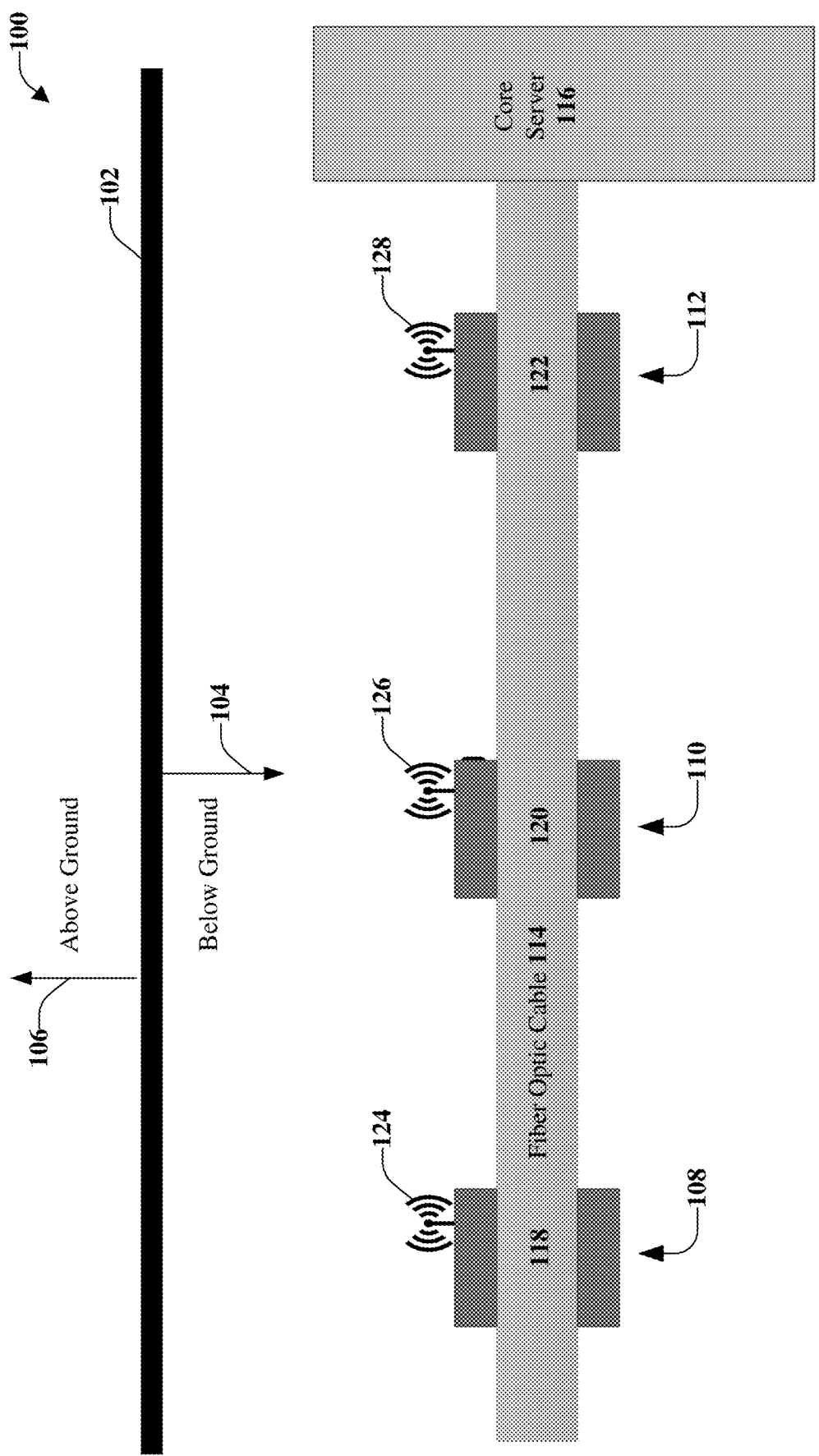
FIG. 1 illustrates an example, non-limiting, system for facilitating an air to fiber optic advanced communications network in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

The use of communication devices is ubiquitous. It is expected that ground-based, aerial, maritime, and other forms of travel will continue to grow in the coming years for leisure, business, military, and other uses. Thus, the disclosed embodiments provide a high speed broadband onboard during travel that is comparable to the superior speeds in 5G and 6G on the ground.

Satellites will be part of the 6G eco system. However, the ground network, including a fiber infrastructure (including a fiber optic cable), forms the backbone of ultra-fast communications. Satellites are associated with extremely high costs (e.g., costs associated with launching and maintaining the satellites) and form hazardous conditions in space. Therefore, reducing the dependency on satellites might be desired. As noted, fiber optic cable provides end to end connectivity, however, connectivity has not been available along the fiber optic cable. The disclosed embodiments provide both the end to end connectivity and connectivity along the fiber optic cable, as discussed in further detail below.

An embodiment relates to network equipment that includes a processor and a memory that stores executable instructions that, when executed by the processor, facilitate performance of operations. The operations can include receiving, via a receiver, a wireless signal that originated from a device located above a ground surface. The network equipment is located below the ground surface. The operations can also include transforming, via a converter, the wireless signal into an optical signal that is transmitted via a fiber optic cable below the ground surface. The receiver and the converter are located on a first side of the fiber optic cable. Further, the operations can include using a reflector to transmit light along the fiber optic cable at a defined angle. The reflector can be located at a second side of the fiber optic cable. The first side is closer to the ground surface as compared to the second side. The defined angle can be an angle approaching zero degrees.

In an example, the reflector is adjustable based on feedback received from an end terminal transceiver that is associated with the network equipment. Further to this example, the reflector is adjusted as a result of frequencies, associated with objects traversing on the ground surface, that are present above or around the network equipment.

According to some implementations, the wireless signal is a first wireless signal, and the optical signal is a first optical signal. Further to these implementations, the operations include transforming, via the converter, a second optical signal, received via the fiber optic cable, into a second wireless signal. Further, the operations include conveying, via a transmitter, the second wireless signal to the device located above the ground surface.

According to an implementation, the network equipment is first network equipment located at a first portion of the fiber optic cable. Further, respective second network equipment, other than the first network equipment are located at respective second portions of the fiber optic cable, the respective second portions being different than the first portion.

In accordance with some implementations, the operations can include detecting, using an interrupt detector, respective light from the respective second network equipment, resulting in respective detected light. Further to these implementations, the reflector temporarily halts a transmission of the light, by the reflector, along the first portion of the fiber optic cable for a defined interval based on the respective detected light.

According to an example, the device is a user equipment, and the wireless signal is received directly from the user equipment. According to another example, the device is a hunter unit that searches for the wireless signal transmitted by a user equipment and that relays the wireless signal from the user equipment to the network equipment. In yet another example, the device is an autonomous floating unit that moves such that the autonomous floating unit is moved between the network equipment and a user equipment that transmitted the wireless signal. The autonomous floating unit operates as a relay to convey the wireless signal from the user equipment and to the network equipment.

According to some implementations, the operations can include recharging a rechargeable battery that provides power to the network equipment. The recharging can include harnessing wireless electromagnetic waves by the rechargeable battery. Alternatively, or additionally, the recharging can include using induction to harness electromagnetic energy from objects passing over the ground surface above or around the network equipment.

According to another embodiment, a method can include converting, by network equipment comprising a processor, a first signal received over the air from a device located above a ground surface into a second signal that is conveyable via a fiber optic cable. The network equipment and the fiber optic cable are located below the ground surface. The method can also include conveying, by the network equipment, the second signal via the fiber optic cable, wherein the conveying comprises deflecting a ray of light from a side of the fiber optic cable and along the fiber optic cable at a defined angle. The first signal can be a wireless signal and the second signal can be an optic signal.

According to some implementations, the defined angle is determined to be near zero degrees. Further to these implementations, the method can include determining, by the network equipment, that a current angle of deflection does not satisfy a function of the defined angle. The method can also include adjusting, by the network equipment, the current angle of deflection to be at near zero degrees. Further to these implementations, the determining can include receiving, from an end terminal transceiver, information indicative of a detected angle of deflection as received at the end terminal transceiver.

In accordance with some implementations, the network equipment is first network equipment, and the method can include evaluating, by the first network equipment, respective light patterns of respective lights transmitted by respective second network equipment, other than the first network equipment. Further, the method can include suspending, by the first network equipment, a transmission of the second signal for an interval defined by the respective light patterns of the respective lights.

Another embodiment relates to a system that can include first network equipment located below a ground surface. The first network equipment receives a first wireless signal transmitted from a first device located above the ground surface. The first network equipment can include a first converter that converts the first wireless signal into a first optical signal. The first network equipment can also include a first reflector that transmits first light along a fiber optic cable at a defined angle. The first optical signal is conveyed with the first light via the fiber optic cable, wherein the fiber optic cable is below the ground surface. The first network equipment is at a first portion of the fiber optic cable, and second network equipment is located below the ground and at a second portion of the fiber optic cable.

The second network equipment can include the second network equipment that includes a second converter that converts a second wireless signal into a second optical signal, wherein the second wireless signal is transmitted from a second device located above the ground surface. The second network equipment can also include a second reflector that transmits second light along the fiber optic cable at the defined angle, wherein the second optical signal is conveyed with the second light via the fiber optic cable.

According to some implementations, the system can include third network equipment, located above the ground surface, that receives the first wireless signal directly from the first device and, operating as an intermediary, redirects the first wireless signal to the first network equipment. In an example, the third network equipment can be a hunter unit. Alternatively, or additionally, the third network equipment can be an autonomous floater.

FIG. 1 illustrates an example, non-limiting, system 100 for facilitating an air to fiber optic advanced communications network in accordance with one or more embodiments described herein. As noted above, fiber optic cable provides end to end connectivity, however, connectivity in not available along the fiber optic cable. The system 100, as well as other systems and other embodiments discussed herein, provide both the end to end connectivity and connectivity along the fiber optic cable.

The disclosed embodiments provide several benefits and advantages. Such benefits and advantages, for example, include, over land, the enablement of ultra-fast broadband communication for aerial vehicles and plane passengers. The ultra-fast broadband is based primarily on ground communication infrastructure (e.g., 5G cellular towers, 6G cellular towers, and so on) and fiber, instead of relying primarily on satellites. Another example benefit and advantage includes, over water, utilization of an under-sea fiber optic cable to provide fast broadband coverage for aerial and maritime vehicles on the ocean and/or other bodies of water. A further benefit and advantage is that the disclosed embodiments provide wireless coverage along the fiber optic cable.

Yet another benefit and advantage is that the disclosed embodiments provide communication access with various user equipment (UE) (e.g., cell phones, tablets, vehicles (including aerial vehicles and nautical vehicles), and so on) and network equipment (e.g., satellites, base stations, access points, hunter units, autonomous floaters, aerial communication interfaces, other network equipment, and so on). Further information related to hunter units, autonomous floaters, and aerial communication interfaces will be discussed in further detail below with respect to at least FIGS. 5-10.

The system 100 includes network equipment, deployed as Multi-Point Fiber Access (MPFA) equipment, located under a ground surface 102, as indicated by arrow 104. Arrow 106 indicates above the ground surface 102. The MPFA equipment is illustrated as first MPFA equipment 108, second MPFA equipment 110, through N MPFA equipment 112, where N is an integer greater than or equal to zero. Also included in the system 100 is a core server 116, which is also referred to as a fiber transceiver and/or end terminal transceiver.

The MPFA equipment (e.g., the first MPFA equipment 108, the second MPFA equipment 110, through the N MPFA equipment 112) are located along a fiber optic cable 114 (e.g., buried fiber optic). For example, the fiber optic cable can be penetrated in order to operatively connect the respective MPFAs to the fiber optic cable. As discussed herein, the fiber optic cable 114 can refer to a single strand of a group of strands associated with a fiber optic cable. The use of multiple MPFA equipment associated with the fiber optic cable is an ad hoc network that can provide more access points, which allows more opportunities for connection via the fiber optic cable. Further, this provides the opportunity for more UEs to be able to connect via the fiber link.

This is beneficial because a fiber optic cable can provide faster, and more reliable connections as compared to a satellite connection. Accordingly, a communication facilitated via a satellite link can be handed over to the MPFA(s) that can provide the communication via a fiber link and/or the communication can originate via the fiber link. Upon or after MPFAs are no longer available, the communication can be transferred to the satellite for communication via the satellite link (or another type of communication link).

According to some implementations, the first MPFA equipment 108 can be located at a first portion 118 of the fiber optic cable 114, the second MPFA equipment 110 can be located at a second portion 120 of the fiber optic cable 114, and the N MPFA equipment 112 can be located at a N portion 122 of the fiber optic cable 114. It is noted that although the network equipment are illustrated as being located at similar distances from on another along the fiber optic cable 114, the disclosed embodiments are not limited to this implementation. Instead, the network equipment can be located along the fiber optic cable 114 at varying distances from one another. Further, although the disclosed embodiments are discussed with respect to buried fiber optic, the disclosed aspects can also be utilized with fiber optic that is not buried underground.

The MPFA equipment can include one or more antennas. For example, the first MPFA equipment 108 includes one or more antennas 124, the second MPFA equipment 110 includes one or more antennas 126, and the N MPFA equipment 112 includes one or more antennas 128. The respective antennas of the one or more antennas (e.g., first antennas of the one or more antennas 124, second antennas of the one or more antennas 126, N antennas of the one or more antennas 128) can be oriented such that signals to and/or from the respective MPFA equipment (e.g., the first MPFA equipment 108, the second MPFA equipment 110, through the N MPFA equipment 112) can be received by and/or received from various equipment located above the ground surface 102.

For example, at least one antenna of the one or more antennas 124 can be oriented such that the first MPFA equipment 108 can communicate with one or more equipment located above the ground surface 102 (e.g., UEs that are located near the ground surface 102 such as UEs being carried in a user's hand, UEs that are located further from the ground surface 102 such as in an electric vehicle or a communication element, component, etc. operatively attached to a vehicle, UEs that are located further from the ground surface, such as UEs in a nautical vehicle, the nautical vehicle itself, UEs located in an aerial vehicle, the aerial vehicle itself, and so on).

Further, other respective antennas of the one or more antennas can be oriented such that signals can be conveyed among the respective MPFA equipment. For example, at least one antenna of the one or more antennas 124 can be oriented such that the first MPFA equipment 108 can communicate with the second MPFA equipment 110, the N MPFA equipment 112, and/or the core server 116. In another example, a first antenna of the one or more antennas 126 can be oriented such that the second MPFA equipment 110 can communicate with the first MPFA equipment 108, a second antenna of the one or more antennas 126 can be oriented such that the second MPFA equipment 110 can communicate with the N MPFA equipment 112 and/or the core server 116.

It is noted that, according to some implementations, the respective antennas can be configurable such that orientation of the antennas can change based on various conditions and/or changes in an environment. For example, the various conditions and/and or changes can be due to vibrations from movement of persons and/or equipment along the ground surface 102, environmental changes to the topography of the ground, resulting in variations along the fiber optic cable 114, and so on.

Figure 2:
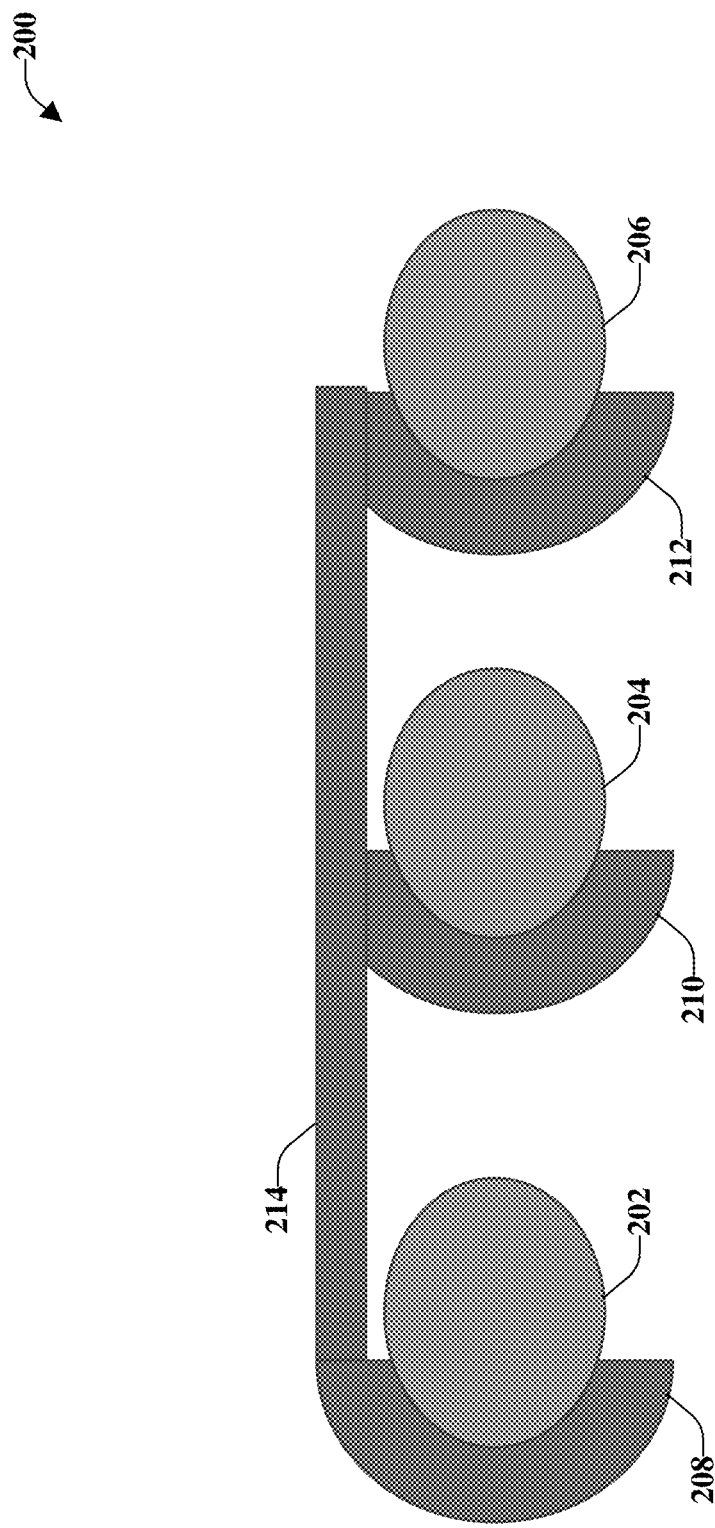
FIG. 2 illustrates an example, non-limiting, representation of an embodiment that includes multiple fiber strands in accordance with one or more embodiments described herein.

FIG. 2 illustrates an example, non-limiting, representation of an embodiment 200 that includes multiple fiber strands in accordance with one or more embodiments described herein. Repetitive description of like elements employed in other embodiments described herein is omitted for sake of brevity.

As illustrated in FIG. 2, a fiber optic cable (e.g., the fiber optic cable 114) can include multiple strands, such as a first fiber optic strand 202, a second fiber optic strand 204 through an M fiber optic strand 206, where M is an integer greater than or equal to zero. Although three fiber optic strands are illustrated in FIG. 2, the disclosed embodiments are not limited to this implementation and any number of fiber optic strands can be included in a fiber optic cable.

As illustrated, MPFA equipment, or a portion thereof, can be associated with the fiber optic strands. For example, first MPFA equipment 208 is associate with the first fiber optic strand 202, second MPFA equipment 210 is associate with the second fiber optic strand 204, and M MPFA equipment 212 is associate with the M fiber optic strand 206. Further, the MPFA equipment can be operatively connected to one another, as indicated at 214.

Figure 3:
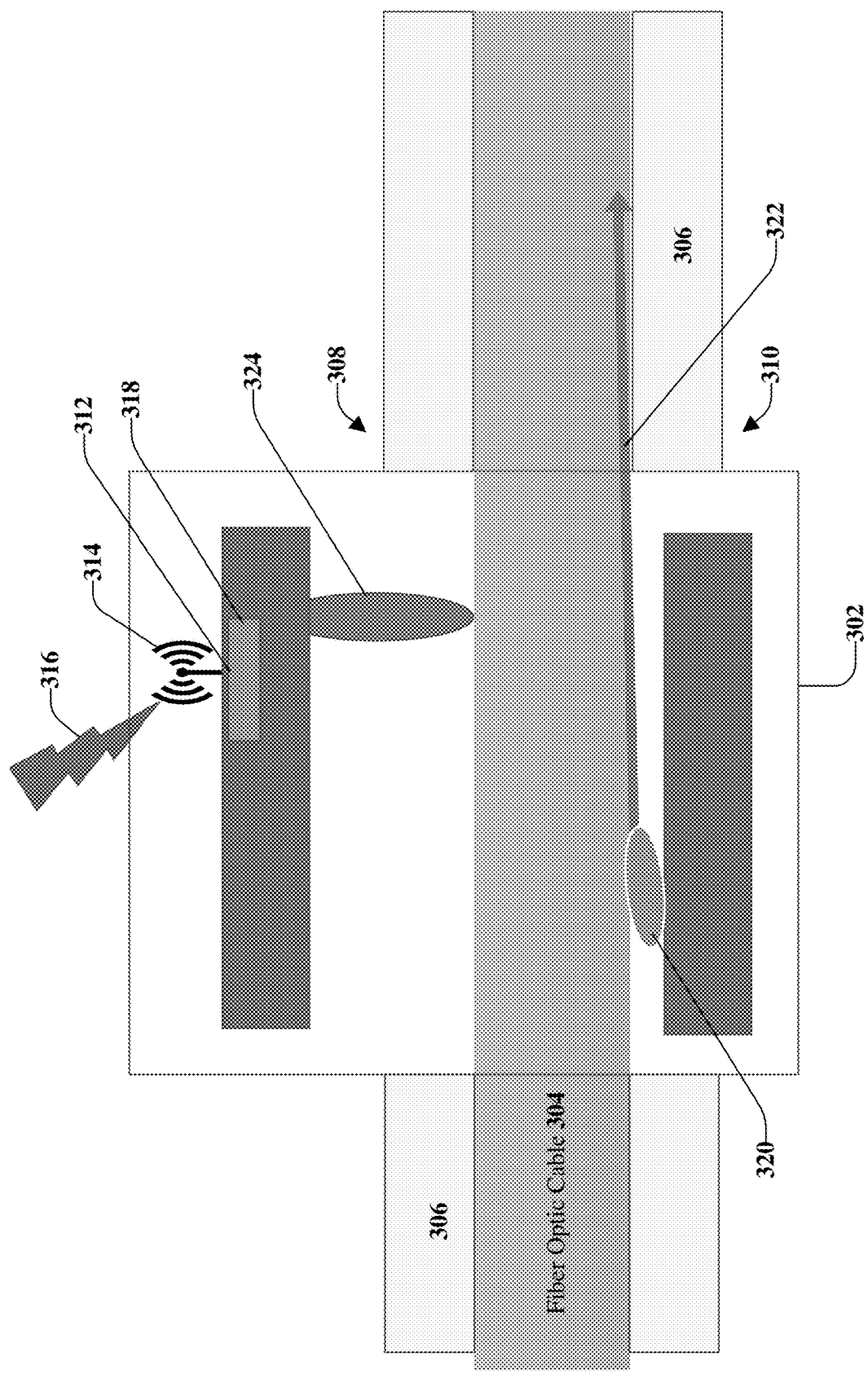
FIG. 3 illustrates an example, non-limiting, implementation of network equipment in accordance with one or more embodiments described herein.

FIG. 3 illustrates an example, non-limiting, implementation of network equipment in accordance with one or more embodiments described herein. Repetitive description of like elements employed in other embodiments described herein is omitted for sake of brevity.

As illustrated, the network equipment can be MPFA equipment 302 located along a fiber optic cable 304, which is encased in a protective coating 306. It is noted that the fiber optic cable 304 can be a single strand (e.g., the first fiber optic strand 202, the second fiber optic strand 204, the M fiber optic strand 206) of a group of strands of the fiber optic cable 304. The protective coating 306 can also be referred to as a jacket, cladding, coating, and so on. For purposes of discussion, the fiber optic cable 304 includes a first side 308 and a second side 310 from the perspective of a ground surface (e.g., the ground surface 102). The first side 308 and the second side 310 can be opposite sides of the fiber optic cable 304. The first side 308 is a portion of the fiber optic cable 304 that is located closer to the ground surface as compared to the second side 310.

The MPFA equipment 302 includes a receiver 312 that is associated with one or more antennas 314. It is noted that although discussed with respect to a receiver, the MPFA equipment 302 can also include a transmitter, or a transceiver. The receiver 312 can receive one or more wireless signals 316 that originate external to the MPFA equipment 302. For example, the one or more wireless signals 316 can be received from devices and/or equipment located above the ground surface. According to an implementation, one or more wireless signals can be received directly from a user equipment, or indirectly through another device (e.g., a hunter device, an autonomous floating unit, aerial communication interfaces, and so on). As discussed with respect to FIG. 1, the network equipment can be located below the ground surface. However, as also noted, the disclosed embodiments can be utilized with fiber optic cable located above the ground surface.

Also included in the MPFA equipment 302 can be a converter 318 that can transform the one or more wireless signals 316 into one or more optical signals that are transmitted via the fiber optic cable 304. Thus, the converter 318 can be a wireless signal to optical signal converter. Although the converter 318 is located near the one or more antennas 314 at the first side 308 of the fiber optic cable 304, according to some implementations, the converter 318 can be located at another location, such as on the second side 310 of the fiber optic cable 304 or at another position on the first side 308, the second side 310, or other sides of the fiber optic cable 304.

According to some implementations, the converter 318 can transform an optical signal (e.g., a second optical signal), received via the fiber optic cable, into a wireless signal (e.g., a second wireless signal). Further, a transmitter (not illustrated) or a transmitter/receiver (e.g., a transceiver) can convey the second wireless signal to the device(s) located above the ground surface.

In addition, the MPFA equipment 302 can include a reflective system 320 (or mirroring system) located at the second side 310 of the fiber optic cable 304. The reflective system 320 can transmit light (e.g., one or more rays of light 322) along the fiber optic cable 304 at a defined angle. For example, for operation of a traditional communication system utilizing a fiber optic cable, light is reflected through the fiber optic cable toward a core server (e.g., the core server 116) in a straight direction (e.g., through a middle of the fiber optic cable). However, as discussed herein, the reflective system 320 transmits light toward the core server from the bottom (e.g., second side 310) of the fiber optic cable 304. The defined angle can be an angle approaching zero degrees (e.g., an almost zero degree light ray entry), which allows the light to travel a greater distance as compared to light pointing upwards or downwards and penetrating the protective coating 306.

Figure 4:
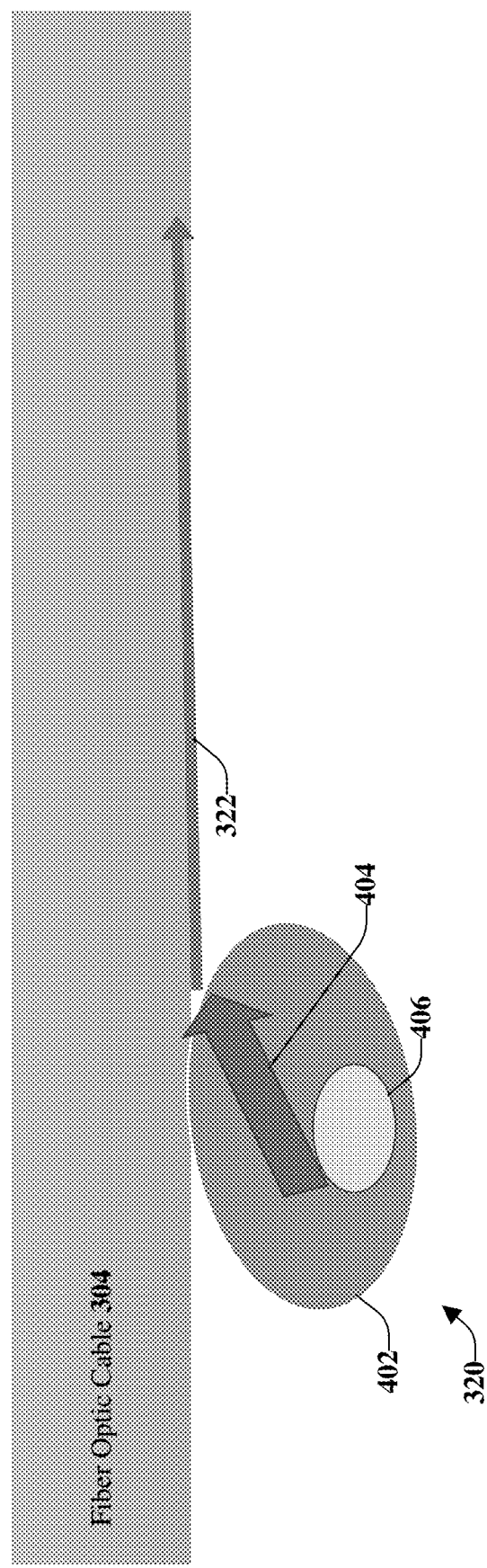
FIG. 4 illustrates an example, non-limiting, mirroring system in accordance with one or more embodiments described herein.

According to some implementations, the reflective system 320 can be configurable or adjustable based on feedback received from an end terminal transceiver (e.g., the core server 116) that is associated with the MPFA equipment 302. The adjustment of the reflective system 320 can be performed dynamically or automatically by the MPFA equipment 302 (e.g., without manual intervention). In an example, the reflective system 320 can be adjusted as a result of frequencies, associated with objects traversing on the ground surface, that are present above or around the network equipment. For example, as people walk along the ground surface (e.g., on a sidewalk, on a walking trail, along a path in a park or wooded area), as vehicles traverse over the ground surface (e.g., on a road or highway, over a driving trail, and so on), vibrations from the movement can slightly change the orientation of the reflective system 320 or the fiber optic cable 304. In another example, various environmental changes might affect the fiber optic cable (e.g., ground shifts, earthquakes, erosion, water, floods, burrowing animals, and so on). Therefore, over time, adjustments to the angle of projection of the light ray might be beneficial to operation, or even necessary. In further detail, FIG. 4 illustrates an example, non-limiting, reflective system in accordance with one or more embodiments described herein. Repetitive description of like elements employed in other embodiments described herein is omitted for sake of brevity. The reflective system 320 can include a fixed piece 402 that is operatively attached to the fiber strand (e.g., the fiber optic cable 304). For example, the fixed piece 402 can be attached tightly to the fiber strand using various ways for connection.

The reflective system 320 can also include a laser shooter 404 (also referred to as a laser gun) that transmits the one or more rays of light 322. The laser shooter 404 is movable and/or adjustable based on feedback from the end terminal transceiver (e.g., the core server 116). Further, the reflective system 320 can include a base 406 that is movable and/or adjustable and that can control a position of (e.g., tilt or move) the laser shooter 404.

With continuing reference to FIG. 3, the MPFA equipment 302 can also include an interrupt detector 324 that can detect light from other MPFA equipment. The interrupt detector 324 can detect a light pattern and/or a light color from the other network equipment. For example, the MPFA equipment 302 can be located at different portions (e.g., the first portion 118, the second portion 120, the M portion 122, and so on) of the fiber optic cable 304. The interrupt detector 324 can detect respective light from other network equipment (resulting in respective detected light).

Further, the interrupt detector 324 can facilitate a temporary halting of a transmission of the light via the reflective system 320. For example, the halting of the transmission of light can be for a defined interval based on the respective detected light. By temporarily halting the transmission (e.g., being silent), other network equipment can be enabled to transmit their signals without interference and/or interruption. The temporary halting of the signal can be based on respective priorities or service level agreements of UEs connected to the various MPFA equipment. For example, if a first UE is connected to a first MPFA and has a higher priority level as compared to a second UE connected to a second MPFA, the first MPFA can request the second MPFA to temporarily halt its light transmission. Alternatively, the second MPFA can determine that the first UE has priority and can automatically halt its transmission for at least a defined period.

In another example, the temporary suspension of transmission can be based on respective applications executing on the UEs. Continuing the above example, the second UE is outputting a video stream (executing a gaming application or another data intensive application) and the first UE is sending a text message or engaged in a voice communication. In this case, due to the second UE requesting or needing more bandwidth, the first MPFA (associated with the first UE) can temporarily halt its transmission (based on information indicative of the data intensive application and/or based on an inference from one or more signals received from the second MPFA). For example, if a MPFA determines that there is no information of importance to be transmitted, the MPFA can remain silent (e.g., not transmit for a period of time) since multiple MPFAs share the same fiber strand.

The MPFA equipment 302 can also include one or more rechargeable power sources (e.g., one or more batteries) that provide power to the MPFA equipment 302. According to an implementation, the one or more rechargeable power sources can be recharged based on harnessing wireless electromagnetic waves. In accordance with some implementations, the one or more rechargeable power sources can be recharged using induction to harness electromagnetic energy from objects passing over the ground surface above or around the network equipment. In an implementation, a charge collector (e.g., a mat, a platform, and so on) can be arranged such that when a UE is passed over the charge collector, a vehicle travels over the charge collector, the charge collector collects the induction charge and transfers the induction charge to one or more MPFAs.

The following provides further details of the operation and functionality of the MPFA equipment. The MPFA equipment can include one or more batteries (not illustrated). The one or more batteries can be powered via various types of power sources, such as a long lasting chargeable battery, a rechargeable battery, or another type of power source. Further, the MPFA equipment 302 can harness wireless electromagnetic waves to recharge its one or more batteries. In another example, the MPFA equipment can harness energy via induction of passing vehicles. Alternatively, the MPFA equipment can be recharged via solar power or another type of power source.

The MPFA equipment can adjust its transmission power and/or angle of the laser ray (e.g., via an adjustment component) to compensate for non-zero angle penetration. For example, the MPFA equipment can periodically (or at another interval) send a probing ray and/or adjustment ray to the terminal server (e.g., the core server 116) to ensure adequate transmission power (e.g., dBA level).

Periodically, or based on another interval, the MPFA equipment can transmit a beacon to inform wireless nodes about its location. For example, the beacon can be transmitted to devices located above the ground surface 102, which can allow those devices to wirelessly communicate with the MPFA equipment. Further, there can be periodic (no light emission) to provide the opportunity for any unit (e.g., other MPFA equipment) to capture the signal.

The MPFA equipment can claim the channel for a predetermined period, a dynamic period, or another interval. For example, the MPFA equipment can claim the channel by transmitting bi-directional short pulse of distinctive light, frequency, and/or color to the units on the left and right. Embedded in that signal can be one or more of the following: MPFA identifier and location, type of traffic (e.g., emergency, consumer, and so forth), and expected time (or duration) of utilization. The MPFA equipment can analyze the different light signatures to autonomously know how many other MPFA equipment are along the route (e.g., along the fiber optic cable).

The MPFA equipment can operate as access points to individual UEs and/or aggregate users, such as micro cells. Once a wireless device latches onto one MPFA equipment, the MPFA equipment can finish the transmission, or can handoff the transmission to another MPFA equipment or other network equipment. Mobile wireless transmitters can hop from one MPFA equipment to the next MPFA equipment. As it relates to collision, higher order and/or prioritized nodes override lower order and/or lower-prioritized nodes.

The MPFA equipment can include at least one memory (not illustrated), at least one processor (not illustrated), and at least one data store (not illustrated). The at least one memory can be operatively connected to the at least one processor. The at least one memory and/or the at least one data store can store executable instructions that, when executed by the at least one processor can facilitate performance of operations. Further, the at least one processor can be utilized to execute computer executable components stored in the at least one memory and/or the at least one data store.

For example, the at least one memory can store protocols associated with facilitating auto-pilot aerial to surface heterogenous communication networks as discussed herein. Further, the at least one memory can facilitate action to control communication between the MPFA, other MPFA, user equipment, network equipment, and/or other equipment such that the MPFA can employ stored protocols and/or processes to facilitate auto-pilot aerial to surface heterogenous communications as described herein. It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as Synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DRRAM). Memory of the disclosed aspects are intended to include, without being limited to, these and other suitable types of memory. The at least one processor can facilitate communication tasks, such as receipt of wireless signals, conversion of the wireless signals to optical signals, adjusting an angle of light being reflected or mirrored, transmission of light having a particular light and/or pattern, distinguishing signals from other MPFA equipment, temporarily halting transmission of light, requesting other equipment to halt their transmission of light temporarily, and so on, as discussed herein. The at least one processor can be a processor dedicated to analyzing and/or generating information received, a processor that controls one or more components of the system, and/or a processor that both analyzes and generates information received and controls one or more components of the MPFA equipment.

Figure 5:
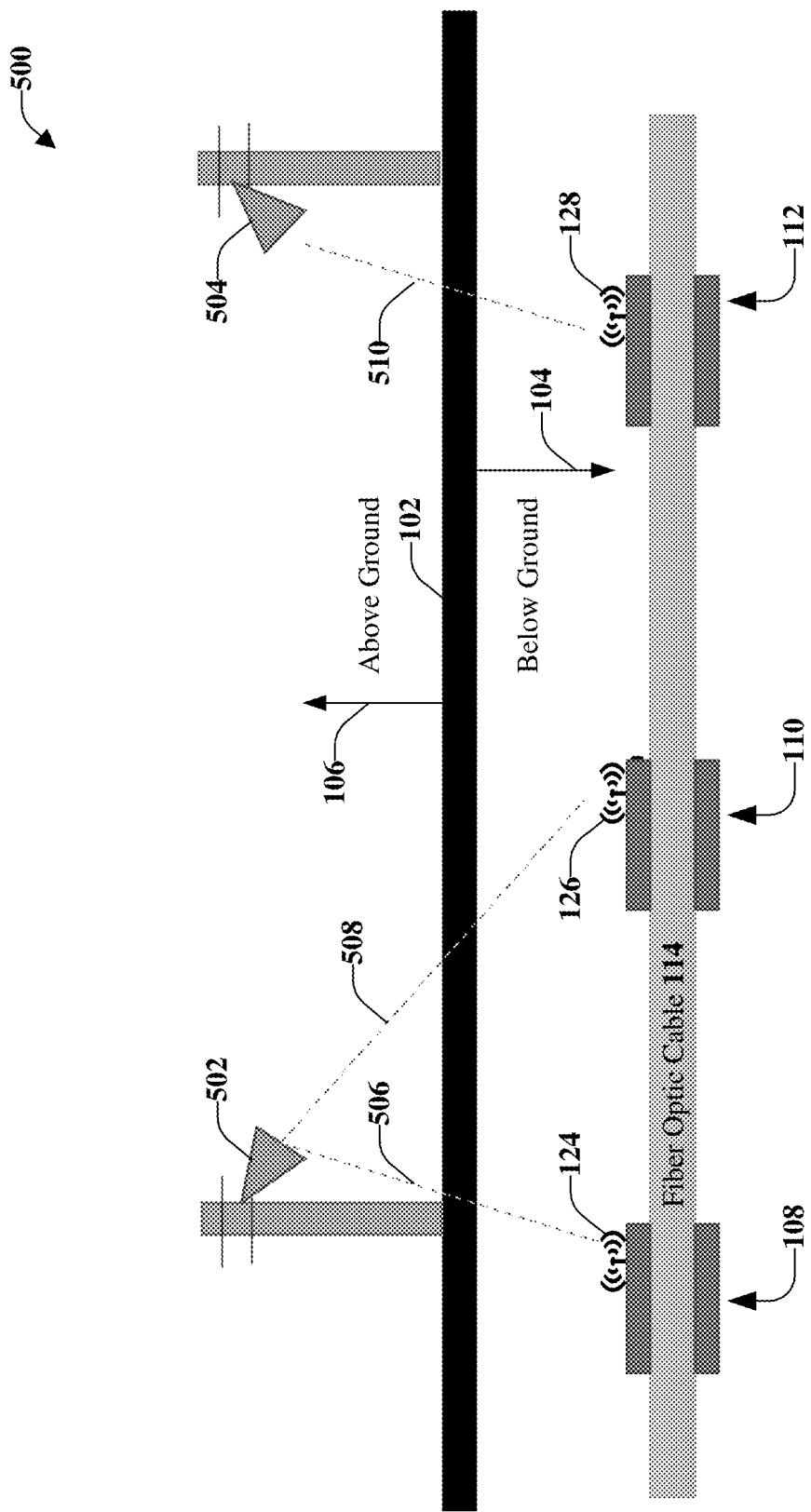
FIG. 5 illustrates an example, non-limiting, system that utilizes a multi-point fiber access system and hunter units in accordance with one or more embodiments described herein.

FIG. 5 illustrates an example, non-limiting, system 500 that utilizes a multi-point fiber access system and hunter units in accordance with one or more embodiments described herein. Repetitive description of like elements employed in other embodiments described herein is omitted for sake of brevity. The system 500 can be configured to perform functions associated with the system 100 of FIG. 1, the network equipment, other equipment, other systems, other processes, and/or computer-implemented methods discussed herein.

One or more hunter units (HUs) can be located throughout a communication network. FIG. 5 illustrates two hunter units, namely, a first hunter unit 502 and a second hunter unit 504. The hunter units are independent wireless units. According to some implementations, the hunter units can be mounted on poles or other structures (e.g., objects, statutes, buildings or other structures, and so on). In some implementations one or more hunter units can be co-located with one another, co-located with an access point, and so on. The hunter units and/or MPFAs can form an ad hoc network, according to some implementations.

Further, the hunter units can discover or search for MPFA units (e.g., the first MPFA equipment 108, the second MPFA equipment 110, the N MPFA equipment 112). The hunter units can aggregate wireless signals from individual users (e.g., respective UEs) and network equipment (e.g., micro cells, cell towers, and so on) and direct or send the aggregate wireless signals directly to underground MPFAs (e.g., the hunter unit operates as a relay). In the example of FIG. 5, the first hunter unit 502 is able to communicate with the first MPFA equipment 108, as indicated by first dashed line 506, and the second MPFA equipment 110, as indicated by the second dashed line 508. Further, the second hunter unit 504 is able to communicate with the M MPFA equipment 112, as indicated by the M dashed line 510.

Hunter units have the capability to rotate, pan, tilt, or otherwise orient its one or more antennas to shoot low in a vertical direction, such that the respective MPFAs can receive and/or transmit one or more signals to/from the respective hunter unit. Further, the hunter units can use a low frequency (e.g., about 600 MHz to about 1000 MHZ), which can also penetrate below the ground surface 102.

Figure 6:
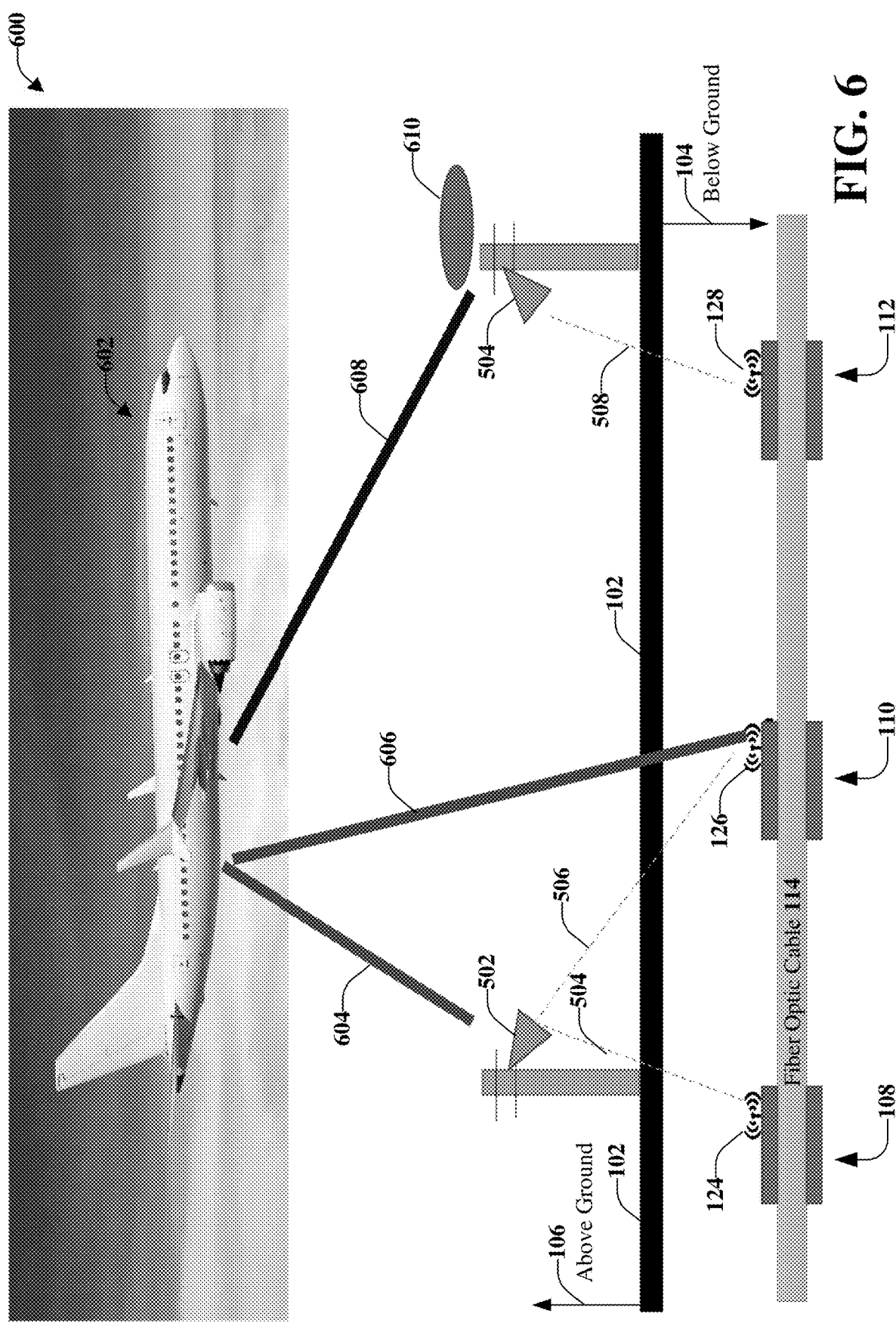
FIG. 6 illustrates an example, non-limiting, system that provides wireless connectivity for aerial vehicles with the utilization of one or more header units in accordance with one or more embodiments described herein.

FIG. 6 illustrates an example, non-limiting, system 600 that provides wireless connectivity for aerial vehicles with the utilization of one or more header units in accordance with one or more embodiments described herein. Repetitive description of like elements employed in other embodiments described herein is omitted for sake of brevity. The system 600 can be configured to perform functions associated with the system 100 of FIG. 1, the system 500 of FIG. 5, the network equipment, other equipment, other systems, other processes, and/or computer-implemented methods discussed herein.

As illustrated, the MPFAs and header units can be utilized to provide wireless connectivity to an aerial vehicle (e.g., a plane 602) and/or one or more UEs located within and/or associated with the plane 602. According to various embodiments, based on one or more header units being available to facilitate communication connectivity from the plane 602 to at least one MPFA, communication links associated with the plane 602 and/or UEs located on, or within, the plane 602 are directed to the hunter unit instead of a satellite link. Accordingly, a previous communication facilitated via a satellite link can be handed over to the hunter unit(s) that can provide the communication via a fiber link. Upon or after hunter units are no longer available, such as the plane moving out of range of the hunter unit, the communication can be transferred to the satellite for communication via the satellite link (or another type of communication link).

As illustrated, a point to point wireless backhaul network can be established between the plane 602 and the first hunter unit 502 (indicated by first link 604), and between the plane 602 and the second MPFA equipment 110 (indicated by second link 606). Further, a laser link 608 can be established between the plane 602 and the second hunter unit 504. The hunter units can be selected such that load balancing of network traffic can be facilitated among the hunter units.

As illustrated, the second hunter unit 504 includes a laser receiver/transmitter 610. The determination of whether to utilize laser can be based on whether or not any humans are detected between the header unit (e.g., the second hunter unit 504) and the plane 602. For example, one or more sensors can be utilized to detect the presence of one or more humans in the vicinity. If the presence of one or more humans are detected, laser is not utilized for safety purposes. However, if a human is not detected, the laser can be utilized. It is noted that detection of a human, via the one or more sensors, can be ongoing such that upon or after the presence of a human is detected, the laser connection is discontinued, at least temporarily. Utilizing of the laser can resume if there are no longer humans detected, and the plane 602 is still within range of the second header unit. It is noted that the first hunter unit 502 can also include a laser receiver/transmitter (not illustrated) and one or more sensors (not illustrated).

The header units can include at least one memory (not illustrated), at least one processor (not illustrated), at least one data store (not illustrated), and/or one or more batteries (not illustrated). The one or more batteries can be rechargeable batteries that are recharged via solar power or another type of power source. In another example, the one or more batteries can be directly recharged via a power source (e.g., an electrical supply).

The at least one memory can be operatively connected to the at least one processor. The at least one memory and/or the at least one data store can store executable instructions that, when executed by the at least one processor can facilitate performance of operations. Further, the at least one processor can be utilized to execute computer executable components stored in the at least one memory and/or the at least one data store.

For example, the at least one memory can store protocols associated with searching for MPFA equipment as discussed herein. Further, the at least one memory can facilitate action to control communication between the hunter unit, other network equipment, and one or more MPFA equipment and can employ stored protocols and/or processes to facilitate such communication as described herein.

The at least one processor can facilitate communication tasks, such as receipt of wireless signals, adjustment of one or more antennas and/or orientation thereof, adjustment of the hunter unit (e.g., changing an orientation of the unit to direct a signal to one or more MPFAs), whether to use laser based on information determined by one or more sensors, and so on, as discussed herein. The at least one processor can be or comprise a processor dedicated to analyzing and/or generating information received, a processor that controls one or more components of the hunter unit, and/or a processor that both analyzes and generates information received and controls one or more components of the hunter unit.

Figure 7:
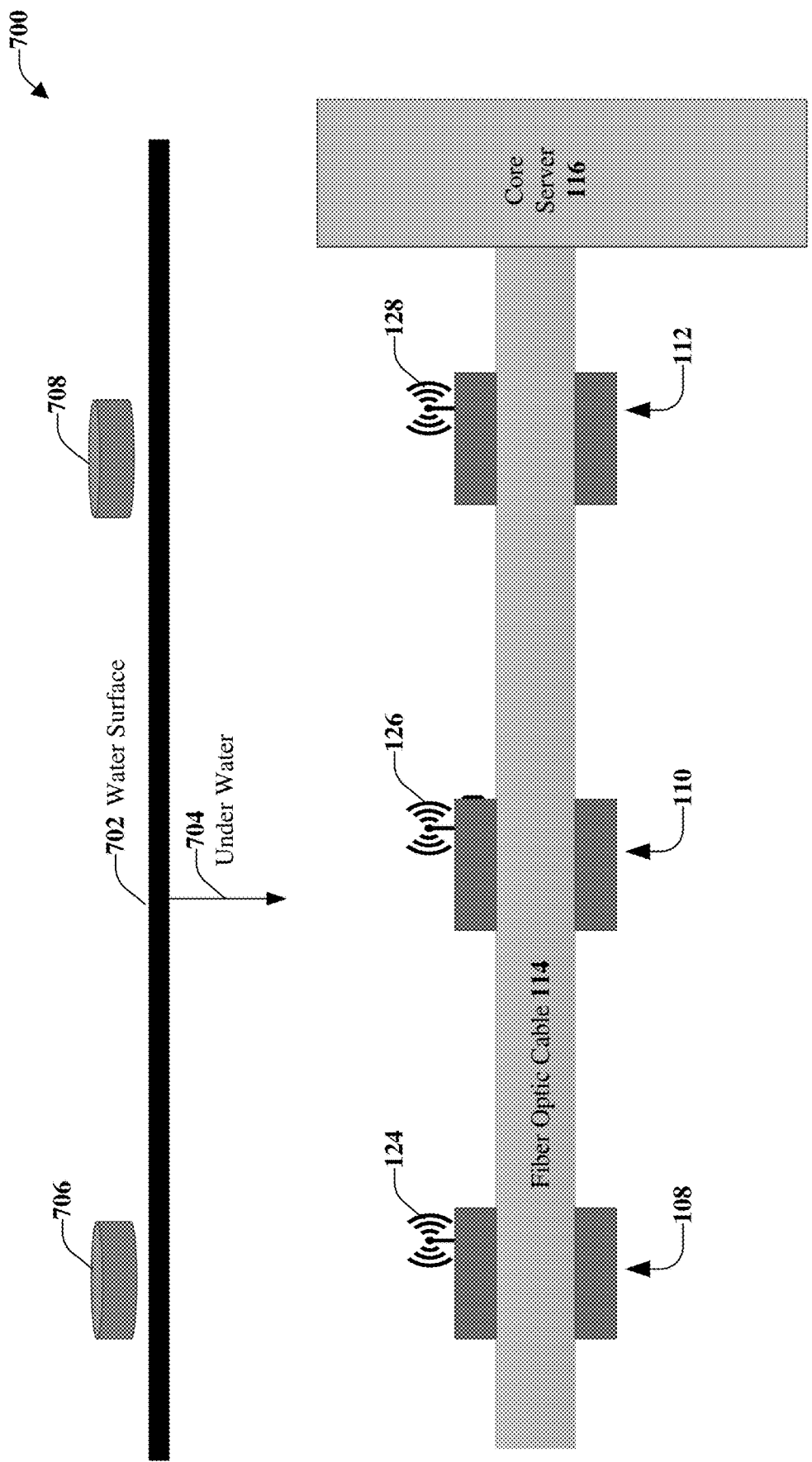
FIG. 7 illustrates an example, non-limiting, system for wireless connectivity for nautical vehicles in accordance with one or more embodiments described herein.

FIG. 7 illustrates an example, non-limiting, system 700 for wireless connectivity for nautical vehicles in accordance with one or more embodiments described herein. Repetitive description of like elements employed in other embodiments described herein is omitted for sake of brevity. The system 700 can be configured to perform functions associated with the system 100 of FIG. 1, the system 500 of FIG. 5, the system 600 of FIG. 6, the network equipment, other equipment, other systems, other processes, and/or computer-implemented methods discussed herein.

In the example of FIG. 7, a water surface 702 is indicated and the one or more MPFAs are located below the water surface 702 (e.g., underwater 704). The one or more MPFAs can be suspended in the water, sitting on the bottom of the body of water (e.g., ocean bottom, sea bottom, pond bottom, and so on), or can be buried under the water bottom or under silt at the bottom of the water.

As illustrated, one or more network equipment can be implemented as autonomous floaters (AFs). Illustrated in FIG. 7 are a first AF 706 and a second AF 708. The Afs (e.g., the first AF 706, the second AF 708, and so on) can be floating on the water surface 702 and might be at least partially submerged in the water. It is noted that more than two AFs can be utilized with the disclosed embodiments, although only two are illustrated and described for purposes of simplicity. Further, although discussed with respect to water, the disclosed embodiments are not so limited. Instead, one or more AFs can be air units that are capable of movement through the air (e.g., as drones or other aerial vehicles).

AFs are autonomous, self-propelled floating vehicles (or floating equipment). For example, the AFS can include a motor, drive unit, propeller, and so on, that can move the AF. AFs can be solar powered or powered through other power supply(ies) or provider(s), such as autonomous energy power. AFs can sense (e.g., detect, receive, decode, decrypt, and so on) one or more signals from MPFA units (e.g., the MPFA equipment). Based on the sensed signals, the respective AFs, via the self-propelling capability of the AF unit, maneuver themselves to be as close as possible to the MPFA unit(s) from which the signal was sensed. The AFs (e.g., the first AF 706, the second AF 708, and/or other AFs) can dynamically (or automatically) position themselves without manual intervention. Further, AFs can communicate with planes (e.g., aerial vehicles) and ships (e.g., nautical vehicles) via light communications (e.g., laser) and/or electromagnetic signal waves.

Figure 8:
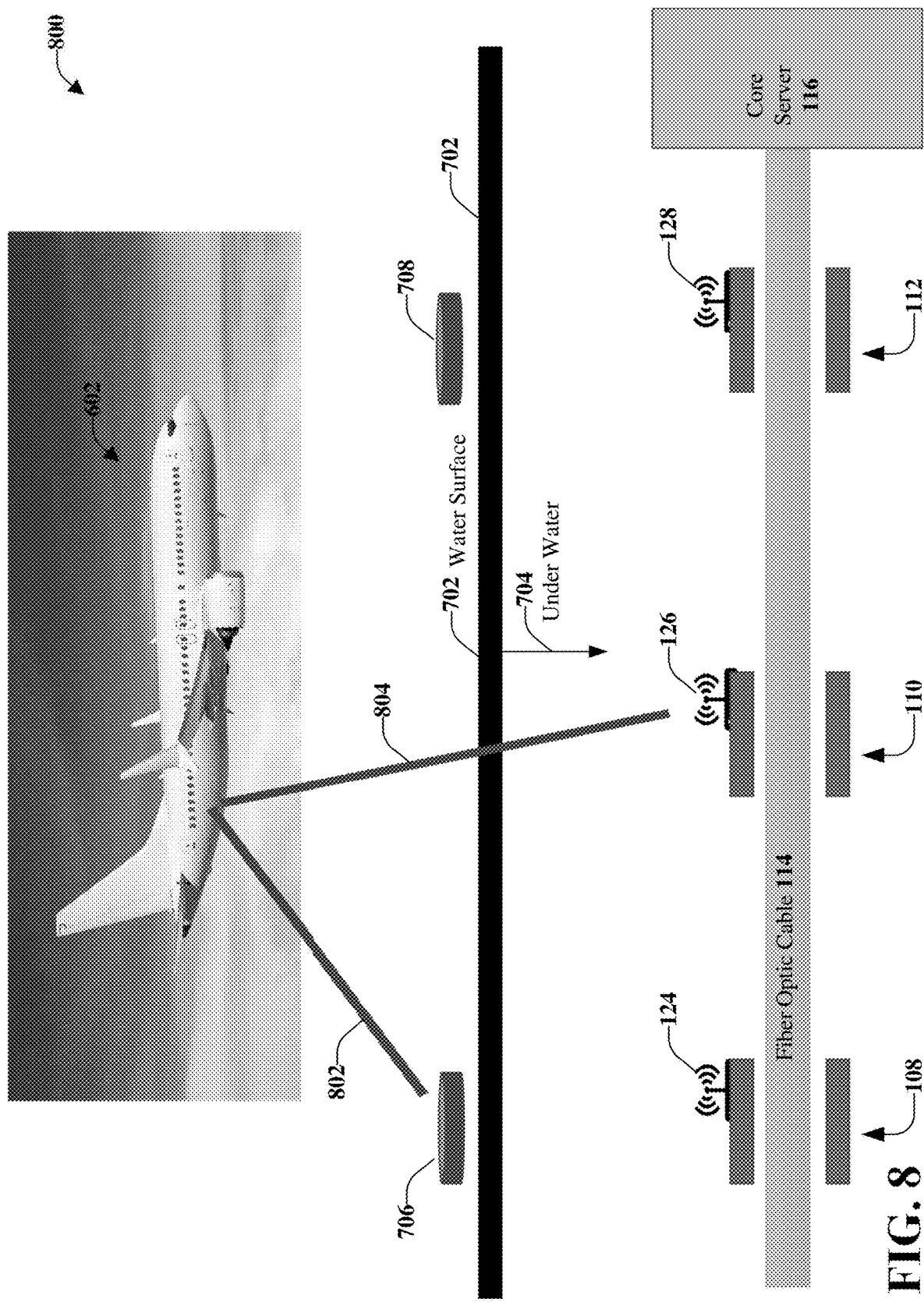
FIG. 8 illustrates an example, non-limiting, system that provides wireless connectivity for aerial vehicles with the utilization of one or more autonomous floaters in accordance with one or more embodiments described herein.

FIG. 8 illustrates an example, non-limiting, system 800 that provides wireless connectivity for aerial vehicles with the utilization of one or more autonomous floaters in accordance with one or more embodiments described herein. Repetitive description of like elements employed in other embodiments described herein is omitted for sake of brevity. The system 800 can be configured to perform functions associated with the system 100 of FIG. 1, the system 500 of FIG. 5, the system 600 of FIG. 6, the system 700 of FIG. 7, the network equipment, other equipment, other systems, other processes, and/or computer-implemented methods discussed herein.

As illustrated, as the plane 602 passes over a section of water, one or more wireless links can be formed to provide wireless connectivity with the plane 602 and/or UEs located on, or within, the plane 602. For example, a first link 802 can be established between the plane 602 and the first AF 706. The first AF 706 can communicate with the first MPFA equipment 108. Further, a second link 804 can be formed directly between the plane 602 and the second MPFA equipment 110.

According to some implementations, one or more AFs can travel to position based on a determination that an aerial vehicle is heading in a certain direction. For example, it can be determined based on receiving information related to the movement of the vehicle that a plane is heading in a certain direction. Based on this information, one or more AFs can self-position (e.g., each AF can position itself) in order to be between the plane and the access point (e.g., an MPFA).

Further, according to various embodiments, based on one or more AFs being available, or being able to move to a position, to facilitate communication connectivity from the aerial vehicle and/or nautical vehicle to at least one MPFA, communication links associated the aerial vehicle, nautical vehicle, and/or UEs located on, or within, the aerial vehicle and/or nautical vehicle are directed to the one or more AFs instead of a satellite link. Accordingly, a new communication and/or a previous communication facilitated via a satellite link can be handed over to the one or more AFs that can provide the communication via a fiber link. Upon AFs becoming, or after the AFs have become, no longer available, the communication can be transferred to the satellite for communication via the satellite link (or another type of communication link).

Although not illustrated, an ad hoc system can be formed that utilizes one or more header units and one or more autonomous floaters, according to some implementations. For example, one or more header units can be installed on various structures located in water (e.g., oil rigs, wind turbines associated with offshore wind farms, offshore platforms used in oil and gas exploration, other offshore structures, bridges, and so on). Further, one or more autonomous floaters can be moved to position.

In some implementations, if the aerial vehicle has a large amount of network traffic that is more than the amount that can be handled by the one or more AFs currently servicing the aerial vehicle. In this situation, information indicative of a request or need for more AFs can be transmitted to nearby AFs. If available, one or more nearby AFs can reposition themselves to assist and can be in position before, or while, the aerial vehicle is within the vicinity. In such a manner, load balancing can be performed among the one or more AFs.

The autonomous floater can include at least one memory (not illustrated), at least one processor (not illustrated), and at least one data store (not illustrated), and/or one or more batteries (not illustrated). The one or more batteries can be or comprise rechargeable batteries that are recharged via solar power or another type of power source.

The at least one memory can be operatively connected to the at least one processor. The at least one memory and/or the at least one data store can store executable instructions that, when executed by the at least one processor can facilitate performance of operations. Further, the at least one processor can be utilized to execute computer executable components stored in the at least one memory and/or the at least one data store.

For example, the at least one memory can store protocols associated with searching for MPFA equipment, moving the autonomous floater based on detection of one or more MPFA equipment and/or one or more aerial vehicles and/or nautical vehicles, and so on as discussed herein. Further, the at least one memory can facilitate action to control communication between the autonomous floater, other network equipment, and one or more MPFA equipment and can employ stored protocols and/or processes to facilitate such communication as described herein.

The at least one processor can facilitate communication tasks, such as receipt of wireless signals, changing location of the autonomous floater and/or orientation thereof, and so on, as discussed herein. The at least one processor can be a processor dedicated to analyzing and/or generating information received, a processor that controls one or more components of the hunter unit, and/or a processor that both analyzes and generates information received and controls one or more components of the hunter unit.

Figure 9:
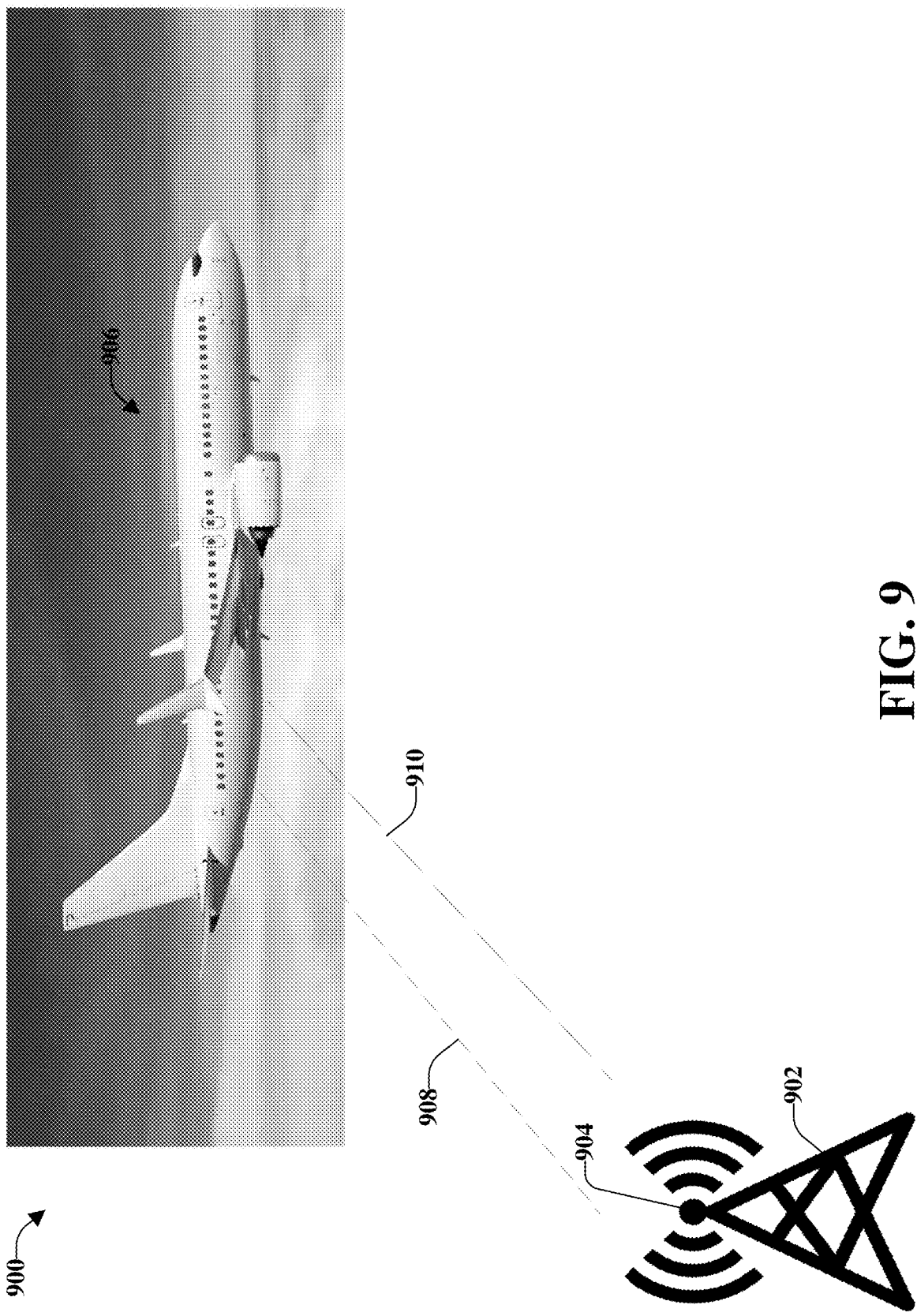
FIG. 9 illustrates an example, non-limiting, system that employs an aerial communication interface to facilitate communication connectivity with aerial vehicles in accordance with one or more embodiments described herein.

FIG. 9 illustrates an example, non-limiting, system 900 that employs an aerial communication interface to facilitate communication connectivity with aerial vehicles in accordance with one or more embodiments described herein. Repetitive description of like elements employed in other embodiments described herein is omitted for sake of brevity. The system 900 can be configured to perform functions associated with the system 100 of FIG. 1, the system 500 of FIG. 5, the system 600 of FIG. 6, the system 700 of FIG. 7, the system 800 of FIG. 8, the network equipment, other equipment, other systems, other processes, and/or computer-implemented methods discussed herein.

The system 900 facilitates communication connectivity from air to network equipment (e.g., cell towers, edge nodes, and so on). As illustrated, network equipment (e.g., an access point or cellular tower 902) can be equipped with an Aerial Communication Interface (ACI 904). The ACI 904 can use laser communication systems and wireless backhaul system at the front interface of the RAN to form a wireless pipe (e.g., indicated by wireless signal link 908 and laser link 910) with the flying planes 906 or other aerial vehicles. Planes (e.g., ACI search equipment), while flying, will search for cell towers that are equipped with ACI. Upon or after such cell tower or ACI is discovered, the plane (e.g., via transceivers configured to provide such communication links) can establish connection to the ACIs to provide broadband to UEs on board the plane.

The angle of one or more antennas, or the entire ACI, can be upward, toward an aerial vehicle. Further, since the angle is upward, away from the ground surface, an amount of transmit power emitted by the ACI can be more power than can be emitted based on the ACI being angled toward the ground. For example, the transmission is from machine-to-machine or object-to-object and/or the distance between the ACI and the aerial vehicle is larger than the distance from the ACI to the ground, therefore, the transmit power can be increased. Further, the ACI can be automatically adjusted in order to attempt to achieve line-of-sight with the aerial vehicle as long as possible. Thus, the ACI can include a movement element, component, unit, etc. (e.g., a motor, drive unit, propeller, and so on) that can be operated to adjust the angle of the ACI based on a position of the aerial vehicle and, according to some implementations, can track the movement of the aerial vehicle as it moves into and out of range of the ACI.

The use of one or more ACIs can be utilized to provide communication links between the plane and a fiber link. Accordingly, a new communication and/or a previous communication facilitated via a satellite link can be handed over to the ACI that can provide the communication via a fiber link. Upon or after an ACI is no longer available, the communication can be transferred to the satellite for communication via the satellite link (or another type of communication link).

The ACI 904 can include at least one memory (not illustrated), at least one processor (not illustrated), at least one data store (not illustrated), and/or one or more batteries (not illustrated). The one or more batteries can be rechargeable batteries that are recharged via solar power or another type of power source. In another example, the one or more batteries can be directly recharged via a power source (e.g., an electrical supply).

The at least one memory can be operatively connected to the at least one processor. The at least one memory and/or the at least one data store can store executable instructions that, when executed by the at least one processor can facilitate performance of operations. Further, the at least one processor can be utilized to execute computer executable components stored in the at least one memory and/or the at least one data store.

For example, the at least one memory can store protocols associated with searching for arial equipment, moving the ACI based on the detection and movement of the aerial vehicle, and so on as discussed herein. Further, the at least one memory can facilitate action to control communication between the ACI, one or more aerial vehicles, one or more UEs, one or more MPFA equipment, other network equipment, and can employ stored protocols and/or processes to facilitate such communication as described herein.

The at least one processor can facilitate communication tasks, such as receipt of wireless signals, changing orientation and/or tilt angle of the ACI, and so on, as discussed herein. The at least one processor can be a processor dedicated to analyzing and/or generating information received, a processor that controls one or more components of the ACI, and/or a processor that both analyzes and generates information received and controls one or more components of the ACI.

With continuing reference to FIG. 9, in an example operation, a Packet Data Network (PDU) session establishment request can be sent from a UE to a Session Management Function (SMF). The SMF can obtain subscription data (e.g., from a Unified Data Management (UDM)) and policy rules (e.g., from a Policy and Charging Rules Function (PCF)). Based on this, the SMF can establish a session for a user plane. Upon or after the session is established, a request for radio resources can be transmitted from the SMF to an Access Node (AN). The request for radio resources can include the SMF directing the call to the ACI. Upon or after the call is directed to the ACI, the radio resources can be established (or set up) and the AN can reply to the SMF. The User Plane Function (UPF) can be updated, and a tunnel can be sent to the AN. Thereafter, user data can be transmitted.

According to some implementations, one or more of the disclosed embodiments can be utilized as a defense system. For example, since the autonomous floaters and underground (or non-underground) and/or under water wireless nodes (e.g., MPFAs) can cover big swaths of land and water, such equipment can have some military applications in monitoring and tracking. For example, such equipment can be equipped with radars along the cellular wireless interface and these radars can take advantage of the fast fiber connected with the system (e.g., the fiber optic cable). Further, in some implementations, the autonomous floaters and/or MPFAs can be used as a distributed weapon monitoring system to monitor and track objects such as missiles, torpedoes, vehicles (e.g., cars, boats, planes), and so forth.

The disclosed embodiments can comprise use of intelligent self-service equipment. For example, the autonomous floaters and/or hunter units can form ad hoc networks in terms of autonomous forming a transient network that can last for a short period (or a long period, a defined period, and so on) and can self-arrange and/or disarrange themselves after a short period (or a long period, a defined period, and so on) of time. For example, as it relates to mobile access points, a mobile access point might be in a zone that has limited connectivity (e.g., a dead zone) accordingly, autonomous floaters and/or hunter units can move and/or extend coverage to the dead zone to provide the connectivity.

The ad hoc network is self-healing and can perform auto recovery and/or reconstruction without human intervention and based on requests or needs (e.g., many UEs attempting connection). For example, if an autonomous floater and/or hunter unit fails or is taken off-line, other autonomous floaters and/or hunter units can reposition themselves (e.g., physical movement in the case of autonomous floaters, changing an angle or orientation in the case of hunter units) to compensate for the failed unit(s). Alternatively, or additionally, one or more other hunter units and/or autonomous floaters can increase their coverage area (e.g., increase transmit power, increase receive power, and so on). Further, the disclosed embodiments can augment a cellular network and can help prevent network crashes via having one or more backup networks (e.g., satellite backup).

As discussed herein, the various embodiments can auto-pilot and deliver services to users. Further, the various embodiments are autonomous and can form a meaningful network with requested or required elements and connections autonomously to serve particular users. For example, more than one autonomous floater can come together to serve a plane with many passengers. In another example, more than one autonomous floater can come together closer to form a network and these autonomous floaters can travel (far) away from each other after the mission is complete.

The disclosed embodiments also provide augmented service for enhanced user experience. For example, the various network equipment (e.g., MFPAs, hunter units, autonomous floaters, and so on) can communicate amongst themselves to provide acceptable Quality of Service (QoS) levels to end users (e.g., UEs) and also to account for mobility and handovers. In addition, the disclosed embodiments provide augmented network capability for overload protection and network outage prevention for legacy cellular networks. Further, the network equipment and associated components are self-aware of any network failures and congestions (e.g., load balancing) in order to augment one another and dedicate more resources.

Various cost-savings benefits can be realized with the various embodiments discussed herein. For example, the systems can be autonomous systems that can form a network in a self-managing manner and also disintegrate without the need of human intervention. Cost savings can be derived from the full autonomy and no need for operators and manual operation systems compared to legacy networks that implement manual configuration and manual operation.

Further, the disclosed embodiments can be utilized with a flexible payment collector for subscription and/or pay per usage based on a unique code assigned to users (e.g., UEs). In case a non-subscribed user wants to use the system on the fly, the user can be treated as a roaming UE.

For billing and usage tracking, each participant device (e.g., airplane, boat, cell phone owner, and so on) can be assigned a unique code (or an application can be installed and executed on the participant device) for premium access to tap into these advanced spread networks. When the UE connects to one of these access points, the UE has to present its unique code for authentication as a valid user and nodes use these unique codes to track usages and billing, according to some implementations.

Figure 10:
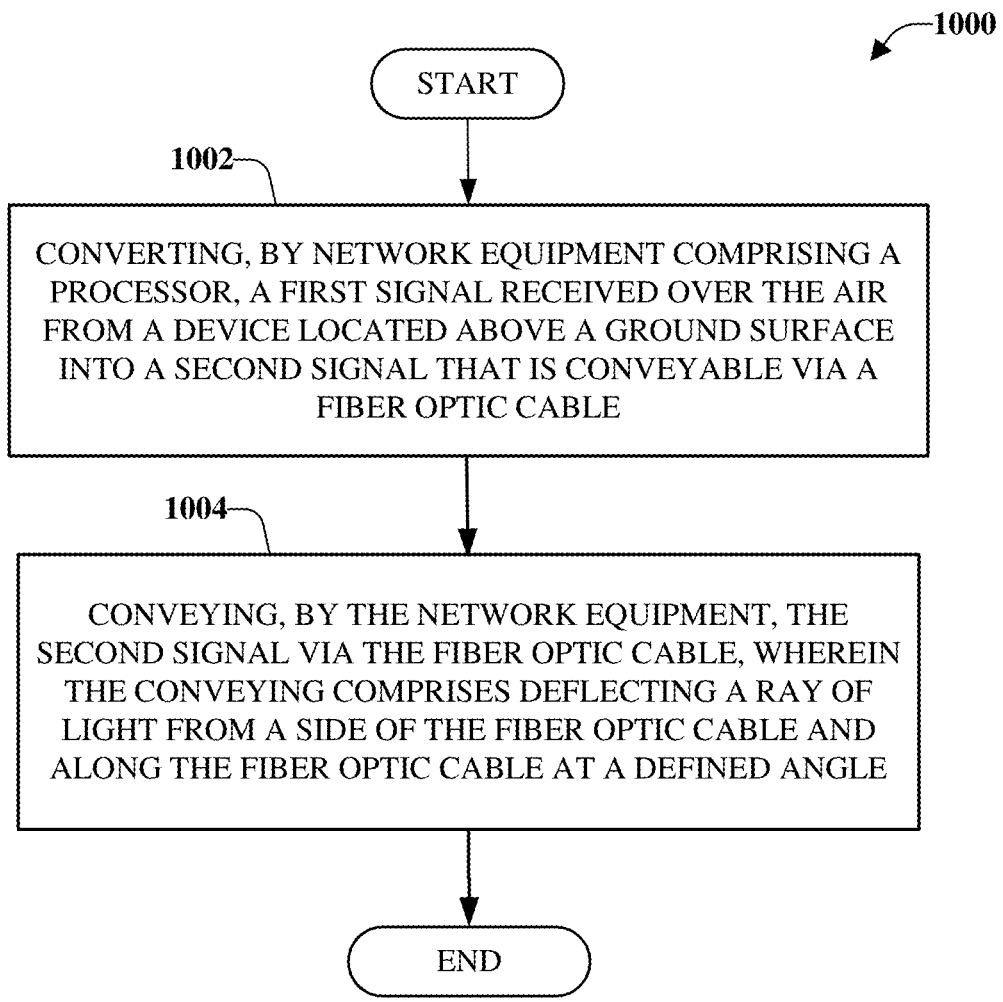
FIG. 10 illustrates an example, non-limiting, computer-implemented method for facilitating auto-pilot aerial to surface heterogenous communication networks in accordance with one or more embodiments described herein.

FIG. 10 illustrates an example, non-limiting, computer-implemented method 1000 for facilitating auto-pilot aerial to surface heterogenous communication networks in accordance with one or more embodiments described herein. Repetitive description of like elements employed in other embodiments described herein is omitted for sake of brevity. The computer-implemented method 1000 can be implemented by a system including a memory and a processor, user equipment including memory and a processor, network equipment including a memory and a processor, a network controller including a memory and a processor, or another computer-implemented device including a memory and a processor.

The computer-implemented method 1000 starts at 1002 with converting, by network equipment comprising a processor, a first signal received over the air from a device located above a ground surface into a second signal that is conveyable via a fiber optic cable. In an example, the first signal is a wireless signal, and the second signal is an optic signal.

In an implementation, the network equipment and the fiber optic cable are located below the ground surface. In another implementation, the network equipment and fiber optic cable are located under water. According to yet another implementation, both the network equipment and fiber optic cable are located above the ground surface.

At 1004, the network equipment conveys the second signal via the fiber optic cable. In an example, the conveying can include deflecting a ray of light from a side of the fiber optic cable and along the fiber optic cable at a defined angle.

Figure 11:
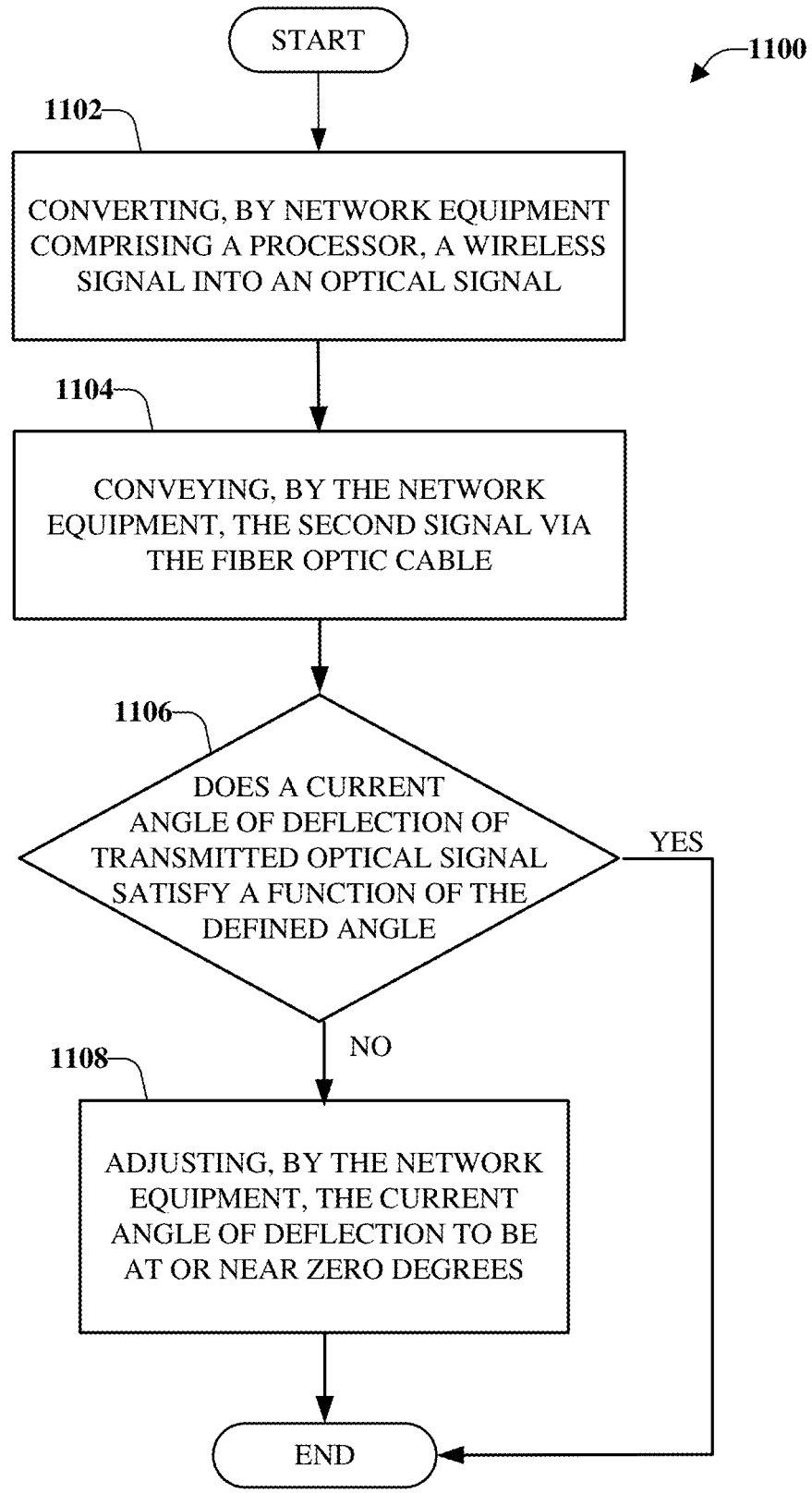
FIG. 11 illustrates an example, non-limiting, computer-implemented method for adjusting an angle of light within a fiber optic cable in accordance with one or more embodiments described herein.

FIG. 11 illustrates an example, non-limiting, computer-implemented method 1100 for adjusting an angle of light within a fiber optic cable in accordance with one or more embodiments described herein. Repetitive description of like elements employed in other embodiments described herein is omitted for sake of brevity. The computer-implemented method 1100 can be implemented by a system including a memory and a processor, user equipment including memory and a processor, network equipment including a memory and a processor, a network controller including a memory and a processor, or another computer-implemented device including a memory and a processor.

At 1102, an MPFA, converts a received wireless signal into an optical signal. The wireless signal can be received from a device (e.g., a UE, network equipment, and so on) located above or over the MPFA. The optical signal can be a signal that is conveyable via a fiber optic cable to which the MPFA (as well as other MPFAs) is operatively connected. The optical signal is transmitted, at 1104, from the MPFA toward a core server via the fiber optic cable at a current angle of deflection.

At 1106, a determination is made whether the current angle of deflection for conveyance of the optical signal satisfies a function of a defined angle. The defined angle can be an angle determined to be at or near zero degrees. In some implementations, the determination can be made based on receiving, from an end terminal transceiver, information indicative of a detected angle of deflection as received at the end terminal transceiver.

If the current angle of deflection satisfies the defined angle ("YES"), the computer-implemented method 1100 ends. Alternatively, if the determination is that the current angle of deflection does not satisfy the defined angle ("NO"), at 1108, the current angle of deflection is adjusted to be at or near zero degrees.

Figure 12:
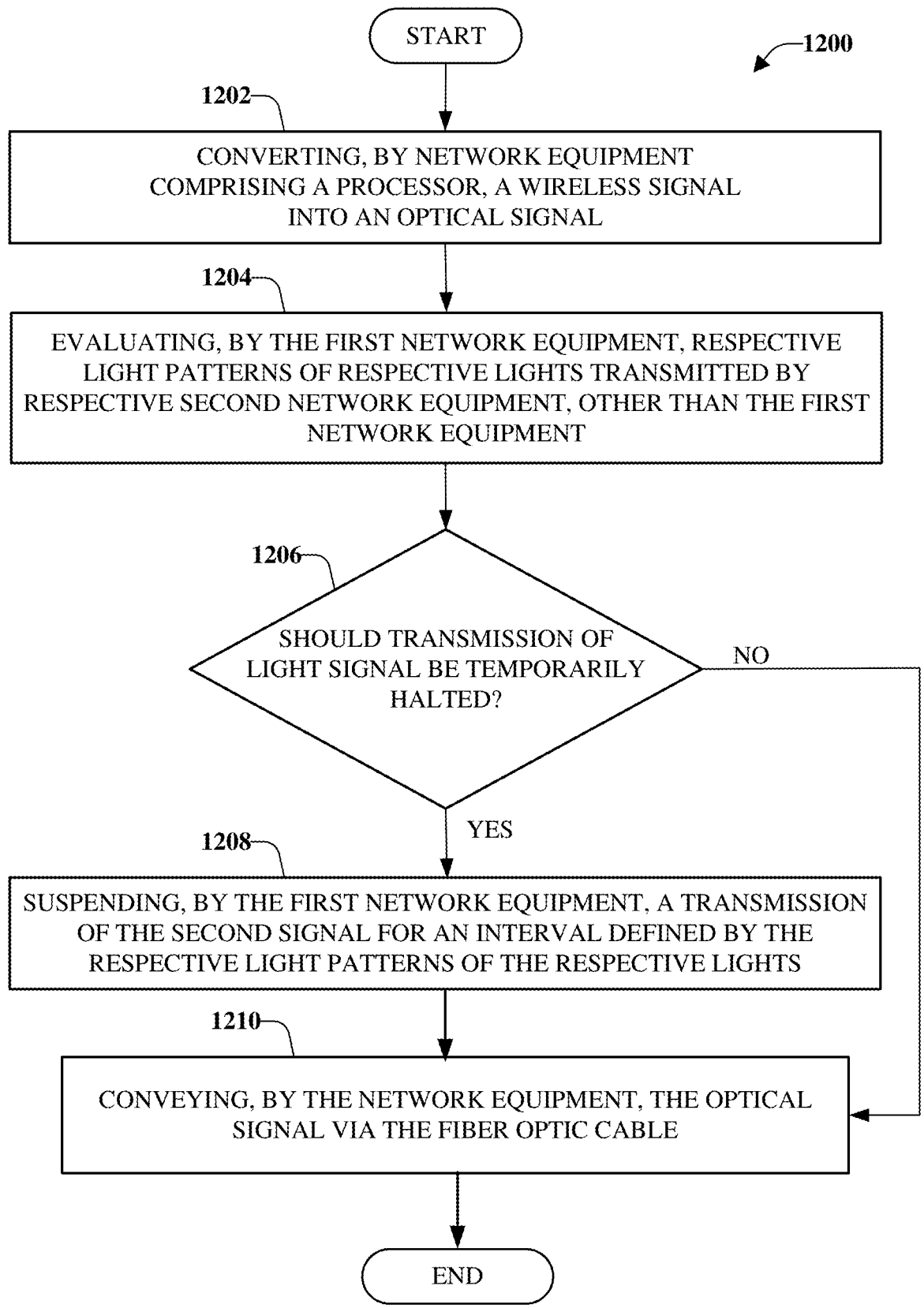
FIG. 12 illustrates an example, non-limiting, computer-implemented method for suspending transmission of optical light within a fiber optic cable in accordance with one or more embodiments described herein.

FIG. 12 illustrates an example, non-limiting, computer-implemented method 1200 for suspending transmission of optical light within a fiber optic cable in accordance with one or more embodiments described herein. Repetitive description of like elements employed in other embodiments described herein is omitted for sake of brevity. The computer-implemented method 1200 can be implemented by a system including a memory and a processor, user equipment including memory and a processor, network equipment including a memory and a processor, a network controller including a memory and a processor, or another computer-implemented device including a memory and a processor.

At 1202, first network equipment, converts a received wireless signal into an optical signal. The wireless signal can be received from devices (e.g., UEs, network equipment, and so on) located at various altitudes above the MPFA. The optical signal can be a signal that is conveyable via a fiber optic cable to which the MPFA (as well as other MPFAs) is operatively connected.

At 1204, respective light patterns of respective lights transmitted by respective second network equipment, other than the first network equipment is evaluated. A determination is made, at 1206, whether a transmission of a light signal should be temporarily halted. The determination can be made based on respective priorities or service level agreements of UEs connected to the various MPFA equipment, based on respective applications executing on the UEs, or based on other considerations.

If the transmission should be temporarily halted ("YES"), at 1208, a transmission of the second signal is suspended for an interval defined by the respective light patterns of the respective lights. Upon or after the interval, or if the determination at 1206 is that the transmission does not need to be halted ("NO"), at 1210, the optical signal is transmitted.

Figure 13:
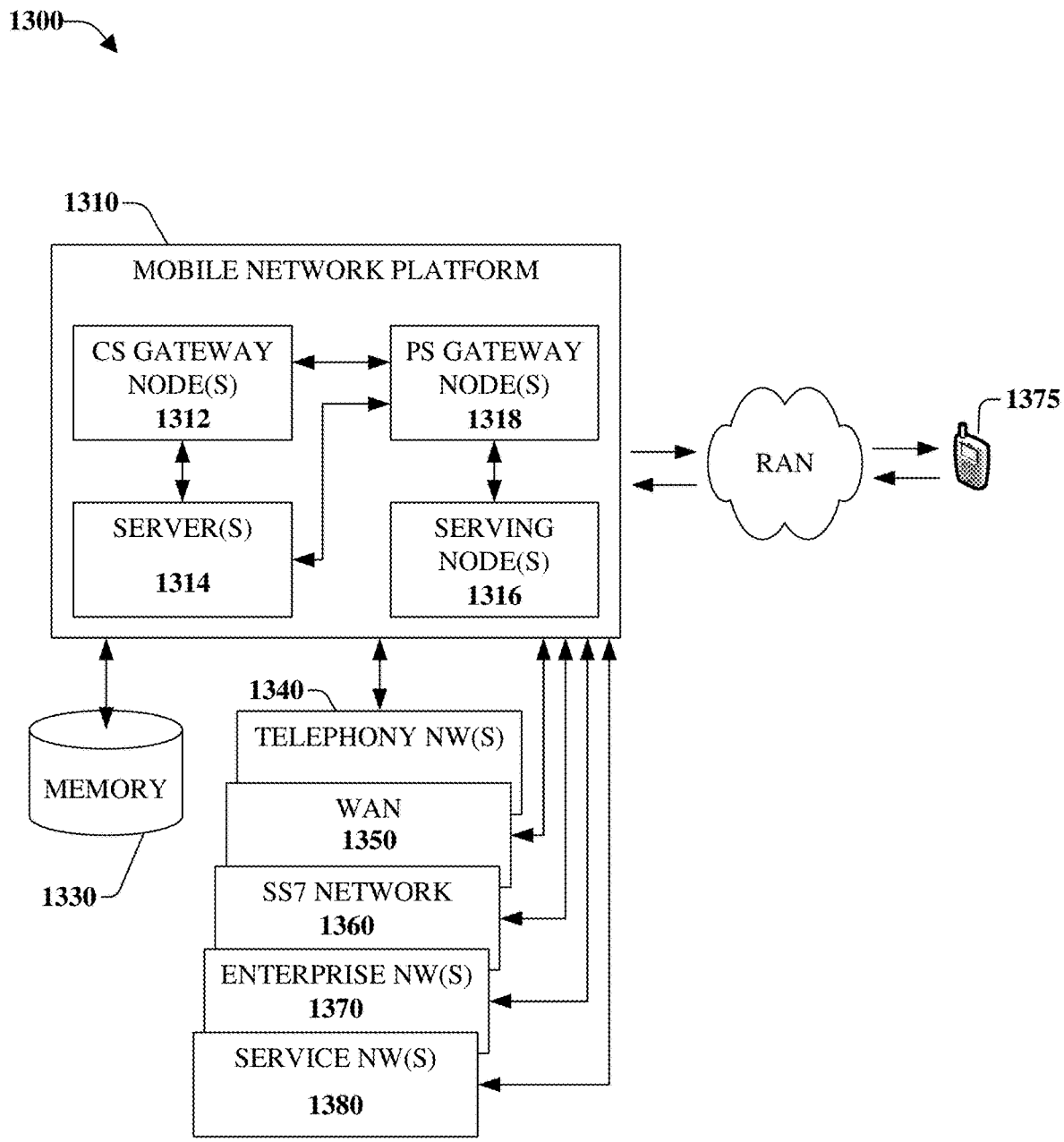
FIG. 13 illustrates an example block diagram of a non-limiting embodiment of a mobile network platform in accordance with various aspects described herein.

Described herein are systems, methods, articles of manufacture, non-transitory machine-readable medium, and other embodiments or implementations that can facilitate the use of high speed broadband for wireless signals. FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, which facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1310 can be included in telecommunications carrier networks and can be considered carrier-side components as discussed elsewhere herein. Mobile network platform 1310 includes CS gateway node(s) 1312 which can interface CS traffic received from legacy networks such as telephony network(s) 1340 (e.g., public switched telephone network (PSTN), or public land mobile network (PLMN)) or a signaling system #7 (SS7) network 1360. Circuit switched gateway node(s) 1312 can authorize and authenticate traffic (e.g., voice) arising from such networks. Additionally, CS gateway node(s) 1312 can access mobility, or roaming, data generated through SS7 network 1360; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication. Mobile network platform 1310 can also include the Mobile Management Entities (MMEs), Home Subscriber Server/Policy and Charging Rules Functions (HSS/PCRFs), Serving Gateways (SGWs), and Packet Data Network Gateways (PGWs) disclosed herein.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1370 can embody, at least in part, a service network(s) such as IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1375.

It is to be noted that server(s) 1314 can include one or more processors configured to confer at least in part the functionality of macro network platform 1310. To that end, the one or more processors can execute code instructions stored in memory 1330, for example. It should be appreciated that server(s) 1314 can include a content manager, which operates in substantially the same manner as described hereinbefore.

In example embodiment 1300, memory 1330 can store information related to operation of wireless network platform 1310. Other operational information can include provisioning information of mobile devices served through wireless network platform 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1370, or SS7 network 1360. In an aspect, memory 1330 can be, for example, accessed as part of a data store component or as a remotely connected memory store.

Figure 14:
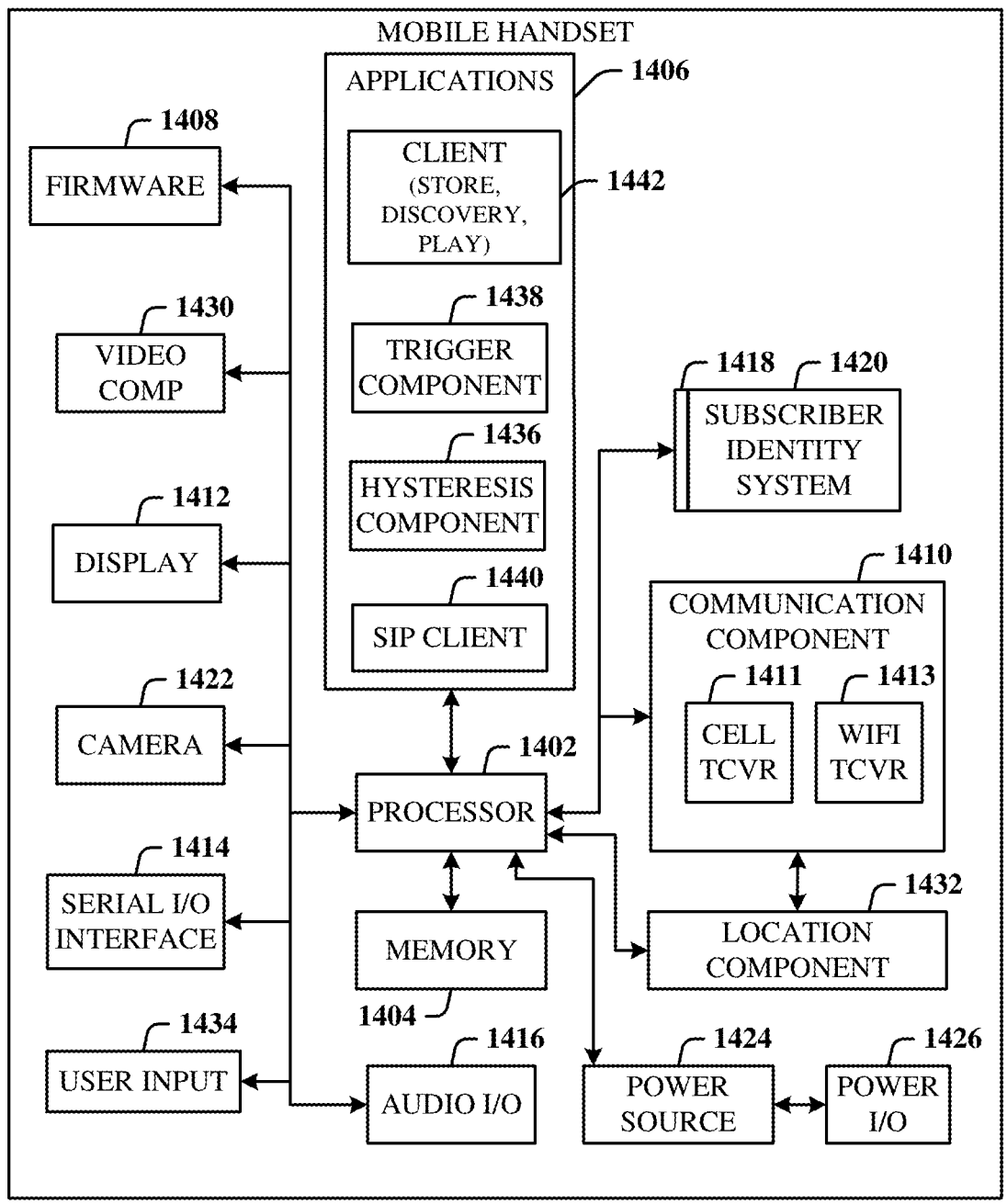
FIG. 14 illustrates an example, non-limiting, block diagram of a handset operable to engage in a system architecture that facilitates wireless communications according to one or more embodiments described herein.

Referring now to FIG. 14, illustrated is an example, non-limiting, block diagram of a handset 1400 operable to engage in a system architecture that facilitates wireless communications according to one or more embodiments described herein. Although a mobile handset is illustrated herein, it will be understood that other devices can be a mobile device and/or UE, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408 and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1400, for example. Audio capabilities are provided with an audio 110 component 1416, which can include a speaker for the output of audio signals related to, for example, indication that the user pressed the proper key or key combination to initiate the user feedback signal. The audio 110 component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420 and interfacing the SIM card 1420 with the processor 1402. However, it is to be appreciated that the SIM card 1420 can be manufactured into the handset 1400 and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing, and sharing of video quotes. The handset 1400 also includes a power source 1424 in the form of batteries and/or an AC power subsystem, which power source 1424 can interface to an external power system or charging equipment (not shown) by a power 110 component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touchscreen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for a dual-mode GSM handset. The handset 1400 can accommodate at least satellite radio services through a handset that can combine wireless voice and digital radio chipsets into a single handheld device.

Figure 15:
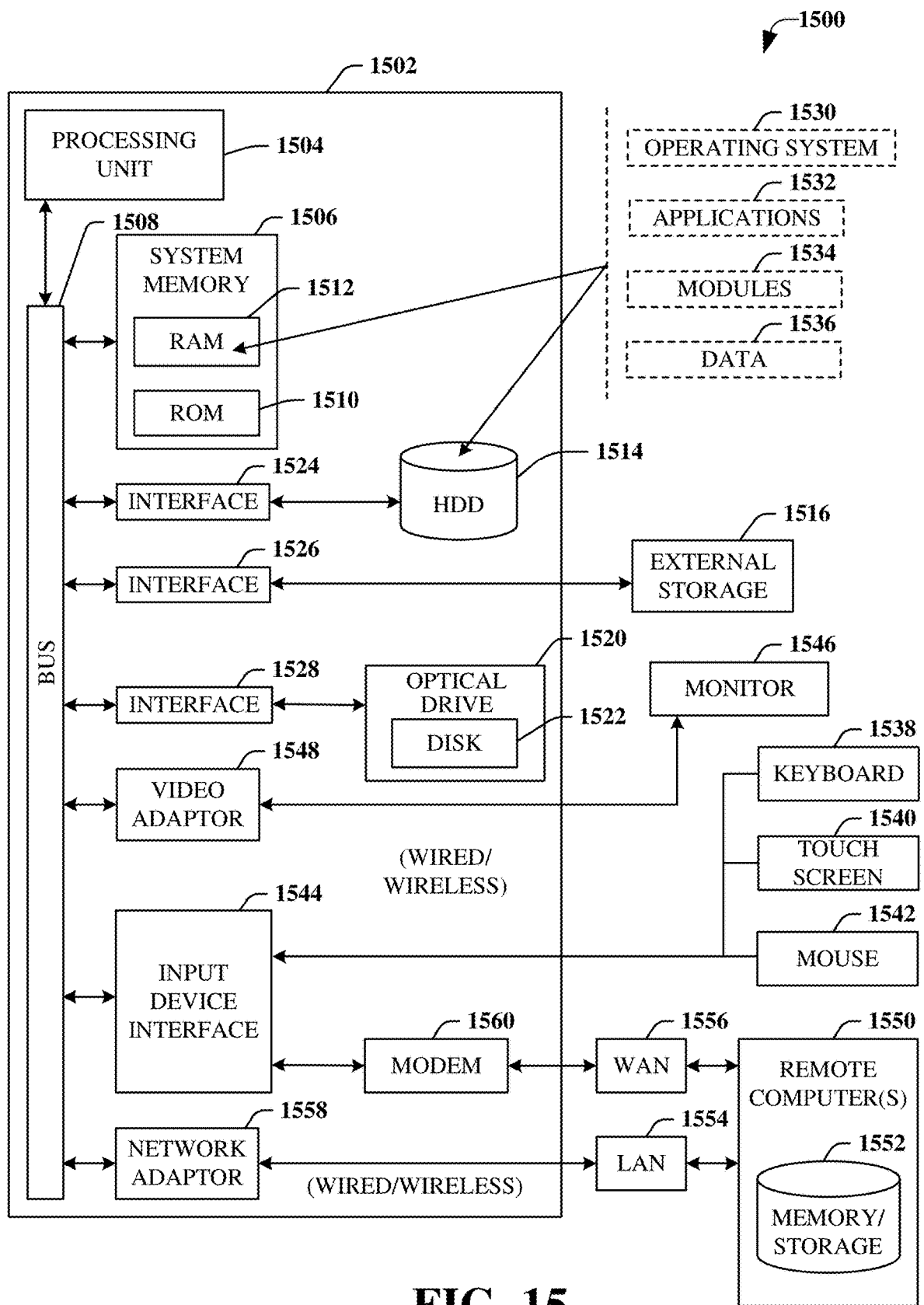
FIG. 15 illustrates an example, non-limiting, block diagram of a computer operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A Basic Input/Output System (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and a drive 1520, e.g., such as a solid state drive, an optical disk drive, which can read or write from a disk 1522, such as a CD-ROM disc, a DVD, a BD, etc. Alternatively, where a solid state drive is involved, disk 1522 would not be included, unless separate. While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and drive 1520 can be connected to the system bus 1508 by an HDD interface 1524, an external storage interface 1526 and a drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For example, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other elements, components, etc. for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other elements, components, etc. of establishing a communications link between the computers can be used.

When used in either a LAN or WAN networking environment, the computer 1502 can access cloud storage systems or other network-based storage systems in addition to, or in place of, external storage devices 1516 as described above, such as but not limited to a network virtual machine providing one or more aspects of storage or processing of information. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or can include a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device," "user equipment" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The terms "real-time," "near real-time," "dynamically," "instantaneous," "continuously," and the like are employed interchangeably or similarly throughout the subject specification, unless context warrants particular distinction(s) among the terms. It should be noted that such terms can refer to data which is collected and processed at an order without perceivable delay for a given context, the timeliness of data or information that has been delayed only by the time requested or required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A network equipment, comprising:
a processor; and
a memory that stores executable instructions that, when executed by the processor, facilitate performance of operations, comprising:
receiving, via a receiver, a wireless signal that originated from a device located above a ground surface, wherein the network equipment is located below the ground surface;
transforming, via a converter, the wireless signal into an optical signal that is transmitted via a fiber optic cable below the ground surface, wherein the receiver and the converter are located on a first side of the fiber optic cable, wherein the network equipment is first network equipment located at a first portion of the fiber optic cable, and wherein respective second network equipment, other than the first network equipment are located at respective second portions of the fiber optic cable, the respective second portions being different than the first portion;
using a reflector to transmit light, corresponding to the optical signal, along the fiber optic cable at a defined angle toward a core server, wherein the reflector is located at a second side of the fiber optic cable opposite the first side of the fiber optic cable and transmits the light from the second side of the fiber optic cable toward the core server, and wherein the first side is closer to the ground surface as compared to the second side; and
detecting, using an interrupt detector, respective light from the respective second network equipment, resulting in respective detected light, wherein the reflector temporarily halts a transmission of the light, by the reflector, along the first portion of the fiber optic cable for a defined interval based on the respective detected light.

2. The network equipment of claim 1, wherein the reflector is adjustable based on feedback received from an end terminal transceiver that is associated with the network equipment.

3. The network equipment of claim 2, wherein the reflector is adjusted as a result of frequencies, associated with objects traversing on the ground surface, that are present above or around the network equipment.

4. The network equipment of claim 1, wherein the defined angle is an angle approaching zero degrees.

5. The network equipment of claim 1, wherein the wireless signal is a first wireless signal, wherein the optical signal is a first optical signal, wherein the operations further comprise:
transforming, via the converter, a second optical signal, received via the fiber optic cable, into a second wireless signal; and
conveying, via a transmitter, the second wireless signal to the device located above the ground surface.

6. The network equipment of claim 1, wherein the device is a user equipment, and wherein the wireless signal is received directly from the user equipment.

7. The network equipment of claim 1, wherein the device is a hunter unit that searches for the wireless signal transmitted by a user equipment and that relays the wireless signal from the user equipment to the network equipment.

8. The network equipment of claim 1, wherein the device is an autonomous floating unit that moves such that the autonomous floating unit is moved between the network equipment and a user equipment that transmitted the wireless signal, and wherein the autonomous floating unit operates as a relay to convey the wireless signal from the user equipment and to the network equipment.

9. The network equipment of claim 1, wherein the operations further comprise recharging a rechargeable battery that provides power to the network equipment comprising harnessing wireless electromagnetic waves by the rechargeable battery.

10. The network equipment of claim 1, wherein the operations further comprise recharging a rechargeable battery that provides power to the network equipment comprising using induction to harness electromagnetic energy from objects passing over the ground surface above or around the network equipment.

11. A method, comprising:
converting, by network equipment comprising a processor, a first signal received over the air from a device located above a ground surface into a second signal that is conveyable via a fiber optic cable, wherein the network equipment and the fiber optic cable are located below the ground surface;
conveying, by the network equipment, the second signal via the fiber optic cable, wherein the conveying comprises deflecting a ray of light from a side of the fiber optic cable and along the fiber optic cable at a defined angle;
evaluating, by the network equipment, respective light patterns of respective lights transmitted by respective second network equipment; and
suspending, by the network equipment, a transmission of the second signal for an interval defined by the respective light patterns of the respective lights.

12. The method of claim 11, wherein the first signal is a wireless signal, and wherein the second signal is an optic signal.

13. The method of claim 11, wherein the defined angle is determined to be near zero degrees, and wherein the method further comprises:
- determining, by the network equipment, that a current angle of deflection does not satisfy a function of the defined angle; and
- adjusting, by the network equipment, the current angle of deflection to be at near zero degrees.

14. The method of claim 13, wherein the determining comprises receiving, from an end terminal transceiver, information indicative of a detected angle of deflection as received at the end terminal transceiver.

15. The method of claim 11, wherein the deflecting is performed using a reflector.

16. The method of claim 11, wherein the device is a user equipment.

17. The method of claim 11, wherein the device is an autonomous floating unit.

18. A system, comprising:
- first network equipment located below a ground surface, wherein the first network equipment receives a first wireless signal transmitted from a first device located above the ground surface, wherein the first network equipment comprises:
  - a first converter that converts the first wireless signal into a first optical signal; and
  - a first reflector that transmits first light along a fiber optic cable at a defined angle, wherein the first optical signal is conveyed with the first light via the fiber optic cable, wherein the fiber optic cable is below the ground surface, wherein the first network equipment is at a first portion of the fiber optic cable, wherein second network equipment is located below the ground surface and at a second portion of the fiber optic cable, and wherein the first reflector is adjustable based on frequencies associated with objects traversing on the ground surface above the first network equipment.

19. The system of claim 18, further comprising the second network equipment, wherein the second network equipment comprises:
- a second converter that converts a second wireless signal into a second optical signal, wherein the second wireless signal is transmitted from a second device located above the ground surface; and
- a second reflector that transmits second light along the fiber optic cable at the defined angle, wherein the second optical signal is conveyed with the second light via the fiber optic cable.

20. The system of claim 18, further comprising third network equipment, located above the ground surface, that receives the first wireless signal directly from the first device and, operating as an intermediary, redirects the first wireless signal to the first network equipment.

* * * * *

UNITED STATES PATENT AND TRADEMARK OFFICE
CERTIFICATE OF CORRECTION

| | | |
|---|---|---|
| PATENT NO. | : 12,261,644 B2 | Page 1 of 1 |
| APPLICATION NO. | : 17/934257 | |
| DATED | : March 25, 2025 | |
| INVENTOR(S) | : Joseph Soryal | |

It is certified that error appears in the above-identified patent and that said Letters Patent is hereby corrected as shown below:

In the Specification

Column 22, Line 56, the number "110" should be letters "I/O"

Column 22, Line 60, the number "110" should be letters "I/O"

Column 23, Line 20, the number "110" should be letters "I/O"

Signed and Sealed this
Sixth Day of May, 2025

Coke Morgan Stewart
*Acting Director of the United States Patent and Trademark Office*